(12) United States Patent
Shibasaki

(10) Patent No.: US 11,989,862 B2
(45) Date of Patent: May 21, 2024

(54) CONTROL APPARATUS, CONTROL METHOD, AND STORAGE MEDIUM

(71) Applicant: CANON KABUSHIKI KAISHA, Tokyo (JP)

(72) Inventor: Akira Shibasaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 17/323,915

(22) Filed: May 18, 2021

(65) Prior Publication Data

US 2021/0366085 A1 Nov. 25, 2021

(30) Foreign Application Priority Data

May 21, 2020 (JP) ................................ 2020-088909

(51) Int. Cl.
*G06T 5/80* (2024.01)
*G02B 13/22* (2006.01)
*G06T 5/50* (2006.01)
*G06T 5/94* (2024.01)
*G06T 7/70* (2017.01)

(52) U.S. Cl.
CPC ................ *G06T 5/80* (2024.01); *G02B 13/22* (2013.01); *G06T 5/50* (2013.01); *G06T 5/94* (2024.01); *G06T 7/70* (2017.01); *G06T 2207/10024* (2013.01); *G06T 2207/10152* (2013.01)

(58) Field of Classification Search
CPC ........... G06T 5/006; G06T 5/008; G06T 5/50; G06T 7/70; G06T 2207/10024; G06T 2207/10152; G06T 2207/10016; G06T 5/20; G06T 5/002; G02B 13/22

USPC ......................................................... 356/445
See application file for complete search history.

(56) References Cited

U.S. PATENT DOCUMENTS 6,144,366 A * 11/2000 Numazaki ............... G06F 3/011
345/157
2011/0141326 A1* 6/2011 Ishida .................... H04N 5/202
358/1.18

FOREIGN PATENT DOCUMENTS

JP 2007-219715 A 8/2007

* cited by examiner

*Primary Examiner* — Md M Rahman
(74) *Attorney, Agent, or Firm* — Canon U.S.A., Inc. IP Division

(57) ABSTRACT

A control apparatus includes: a control unit that controls an image capturing device and an illumination device that includes multiple light sources, and obtains a first number of reference images corresponding to the first number of the light sources being less than the multiple light sources; and a generation unit that generates correction data for correcting illuminance unevenness of a target image based on the first number of the reference images, which is obtained by capturing an image of a measurement target object different from the reference object while turning on a light source of interest out of the multiple light sources. The generation unit generates the correction data corresponding to a light source not included in the first number of the light sources by carrying out interpolation processing while using at least two reference images out of the first number of the reference images.

17 Claims, 17 Drawing Sheets

CONTROL APPARATUS, CONTROL METHOD, AND STORAGE MEDIUM

BACKGROUND

Field

The present disclosure relates to a technique for obtaining reflectance properties of a target object.

Description of the Related Art

Measurement data of a bidirectional reflectance distribution function (BRDF) which represents a variable reflectance property that varies with a direction of illumination or a direction of observation has been used in recent years for quantitative evaluation of material texture of an object.

Moreover, measurement data of a spatially varying bidirectional reflectance distribution function (SVBRDF) has been used for quantitative evaluation of material texture of a target object which has variable reflectance properties depending on the position of the target object. This SVBRDF data represents two-dimensional variable reflectance properties, and is a six-variable data set containing two-dimensional coordinates defining a position on the target object, a zenithal angle as well as an azimuthal angle of incident light, and reflectance ratios of reflected light with respect to a zenithal angle as well as an azimuthal angle, respectively. Japanese Patent Laid-Open No. 2007-219715 discloses a technique for obtaining high-accuracy SVBRDF data by capturing images while changing positions of an illumination device and an image capturing device and then processing captured images.

However, in the case of capturing images while changing the positions of both the illumination device and the image capturing device as disclosed in Japanese Patent Laid-Open No. 2007-219715, the images have to be captured as many times as the number of combinations of the positions of the illumination device and the positions of the image capturing device. As a consequence, the number of times of image capturing operations can become enormous. In addition, since illuminance varies depending on the position on the target object, the technique disclosed in Japanese Patent Laid-Open No. 2007-219715 is configured to correct the illuminance by capturing an image of a perfect diffuser plate. This image capturing for illuminance correction needs to be carried out under the same conditions of illuminance and at the same positions of the image capturing device as those adopted in the image capturing of the target object, thus resulting in the problem of an enormous number of image capturing operations.

SUMMARY

Various embodiments of the present disclosure provide a control apparatus that includes: a control unit configured to control an illumination device including a plurality of light sources, and an image capturing device including an optical system in which an optical axis of a lens on a light incident side is parallel to a principal ray, the control unit being configured to obtain a first number of reference images corresponding to the first number of the light sources, each reference image being obtained by capturing an image of a reference object in a state of turning on the first number of the light sources one by one, the first number being less than a quantity of the plurality of light sources; and a generation unit configured to generate correction data for correcting illuminance unevenness of a target image based on the first number of the reference images, the target image being obtained by capturing an image of a measurement target object being different from the reference object in a state of turning on a light source of interest out of the plurality of light sources. Here, the generation unit generates the correction data corresponding to a light source included in the plurality of light sources but not included in the first number of the light sources by carrying out interpolation processing while using at least two reference images out of the first number of the reference images.

Further features of the present disclosure will become apparent from the following description of exemplary embodiments with reference to the attached drawings.

DESCRIPTION OF THE EMBODIMENTS

Figure 1A:
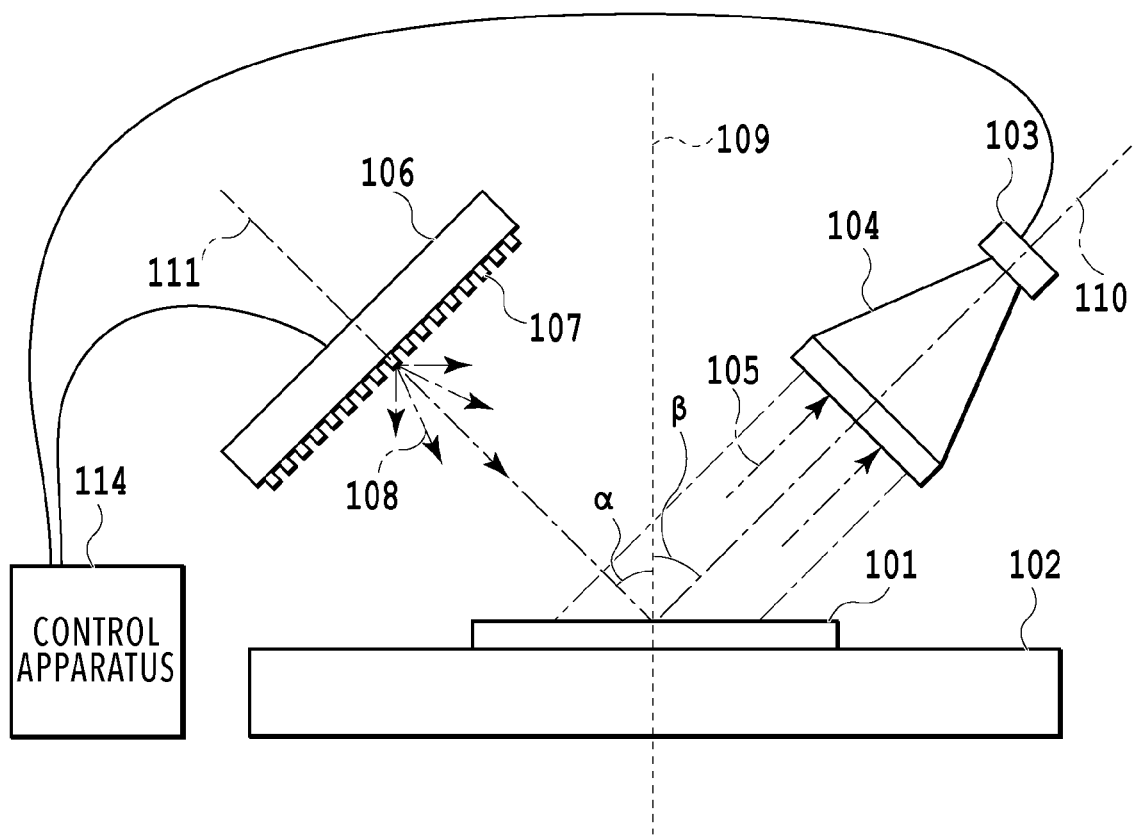
FIG. 1A is a schematic diagram for explaining a configuration of a reflectance property obtaining system according to one embodiment.

Embodiment of the present disclosure will be described below with reference to the drawings. Note that the following embodiments are not intended to limit the scope of the present invention. It is to be also understood that a combination of all of features described in the embodiments are not always essential for a solution of the present invention. The same constituents will be described by denoting the same reference numerals.

First Embodiment

A first embodiment will describe a reflectance property obtaining system which is configured to capture an image by forming an image capturing device side provided with a turned-on light source deriving unit into a telecentric optical system in order to reduce the number of times of image capturing operations for correcting illuminance.

Figure 1B:
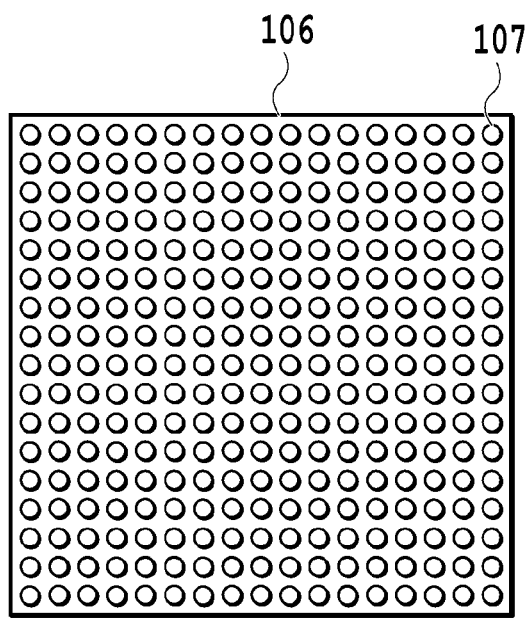
FIG. 1B is another schematic diagram for explaining the configuration of the reflectance property obtaining system according to one embodiment.

FIGS. 1A and 1B are schematic diagrams for explaining a configuration of a reflectance property obtaining system of the first embodiment. FIG. 1A is a front view of the reflectance property obtaining system, which is viewed from the front. FIG. 1B is a front view of an illumination device 106 provided to the reflectance property obtaining system, which is viewed from the front.

Here, reference numeral 101 denotes a measurement target object (hereinafter referred to as a "target object") which is a target of measurement. Reference numeral 102 denotes a fixture for fixing the target object 101.

Reference numeral 103 denotes an image capturing device that captures an image of the target object 101. An image capturing device provided with an area sensor that covers 4096×3000 pixels can be used as the image capturing device 103, for example. Note that the image capturing device 103 has a photoelectric conversion characteristic to obtain a linear signal value relative to illuminance on the target object 101, and image data to be stored is assumed to have gray one-channel luminance information on each pixel and the channel is assumed to be quantized in 16 bits.

Reference numeral 104 denotes an optical system to be attached to and used together with the image capturing device 103. The optical system 104 may apply a telecentric optical system on the image capturing device 103 side, or in other words, an optical system having a telecentric structure in which an optical axis of a lens on an incident side is parallel to a principal ray, and a telecentric lens can be used therein, for example. By forming the optical system 104 with the telecentric lens, the image capturing device 103 can receive only the light as indicated with an arrow 105 out of reflected light from the target object 101, which is parallel to the optical axis of the telecentric lens 104. Here, a telecentric lens provided with a tilt mechanism may be used therein because the target object 101 is inclined with respect to the optical axis of the optical system 104.

Reference numeral 106 denotes an illumination device for emitting light from various directions to the target object 101. The illumination device 106 includes point light sources 107 which are arranged two-dimensionally on a surface thereof. The illumination device 106 provided with arrangement of 17×17 pieces of the point light sources 107 is used in this embodiment. It is possible to obtain reflectance properties with higher angular resolution as a pitch of arrangement of the point light sources 107 is smaller. In the meantime, it is possible to obtain reflectance properties with a wider angle range as the pitch of arrangement of the point light sources 107 is larger. A light emitting diode (LED) can be used as each point light source 107, for example. An optical system of the point light sources 107 is a non-telecentric optical system and each point light source 107 is a diffused light source from which an emitted light is diffused light. In this embodiment, an LED having directional characteristics of variable luminance values depending on outgoing directions of light as indicated with arrows 108 is used as each point light source 107. It is possible to use an LED having directional characteristics defined by a half-value angle of 60°, for example.

Subsequently, positions and orientations of the target object 101, the image capturing device 103, and the illumination device 106 will be described. Reference numeral 109 denotes an axis extending perpendicularly to the target object 101 and passing through the center of the target object 101. Meanwhile, reference numeral 110 denotes the optical axis of the optical system 104. Reference numeral 111 denotes an axis extending perpendicularly to a light emitting surface of the illumination device 106, on which the point light sources 107 are arranged, and passing through the center of the light emitting surface of the illumination device 106. In order to obtain reflectance properties in the vicinity of specular reflection, the positions and the orientations of the image capturing device 103 and the illumination device 106 are set such that the axis 109, the optical axis 110, and the axis 111 are located on the same plane, and that an incident angle α formed between the axis 109 and the optical axis 110 is equal to a reflected angle β formed between the axis 109 and the axis 111.

While this embodiment will be described on the assumption of obtaining the reflectance property in the vicinity of a specular reflection angle at 45°, both the incident angle α and the reflected angle β are set to 45°. Note that the specular reflection angle is not limited only to 45°. It is also possible to obtain the reflectance properties in the vicinity of the specular reflection angles at 30° and 60° by changing the settings of the incident angle α and the reflected angle β. In the case of the specular reflection angle at 30°, the incident angle α and the reflected angle β are set to 30°, respectively. In the case of the specular reflection angle at 60°, the incident angle α and the reflected angle β are set to 60°, respectively.

Note that there is practically no problem even if the incident angle α is not identical to the reflected angle β as the target object 101 is illuminated from various directions by using the illumination device 106. This is due to the following reason. Specifically, a change in luminance attributable to a difference between the incident angle α and the reflected angle β is smaller than a change in luminance attributable to incidence of light in various directions, the former change in luminance is hidden by the latter change in luminance and an effect of the former change on a measurement result is therefore negligible. Meanwhile, the incident angle α may be set to a different angle from the reflected angle β in order to deal with a reflectance property of the target object 101 designed to reflect the light in such a way that a peak direction of the reflected light is different from the direction of specular reflection.

Figure 17:
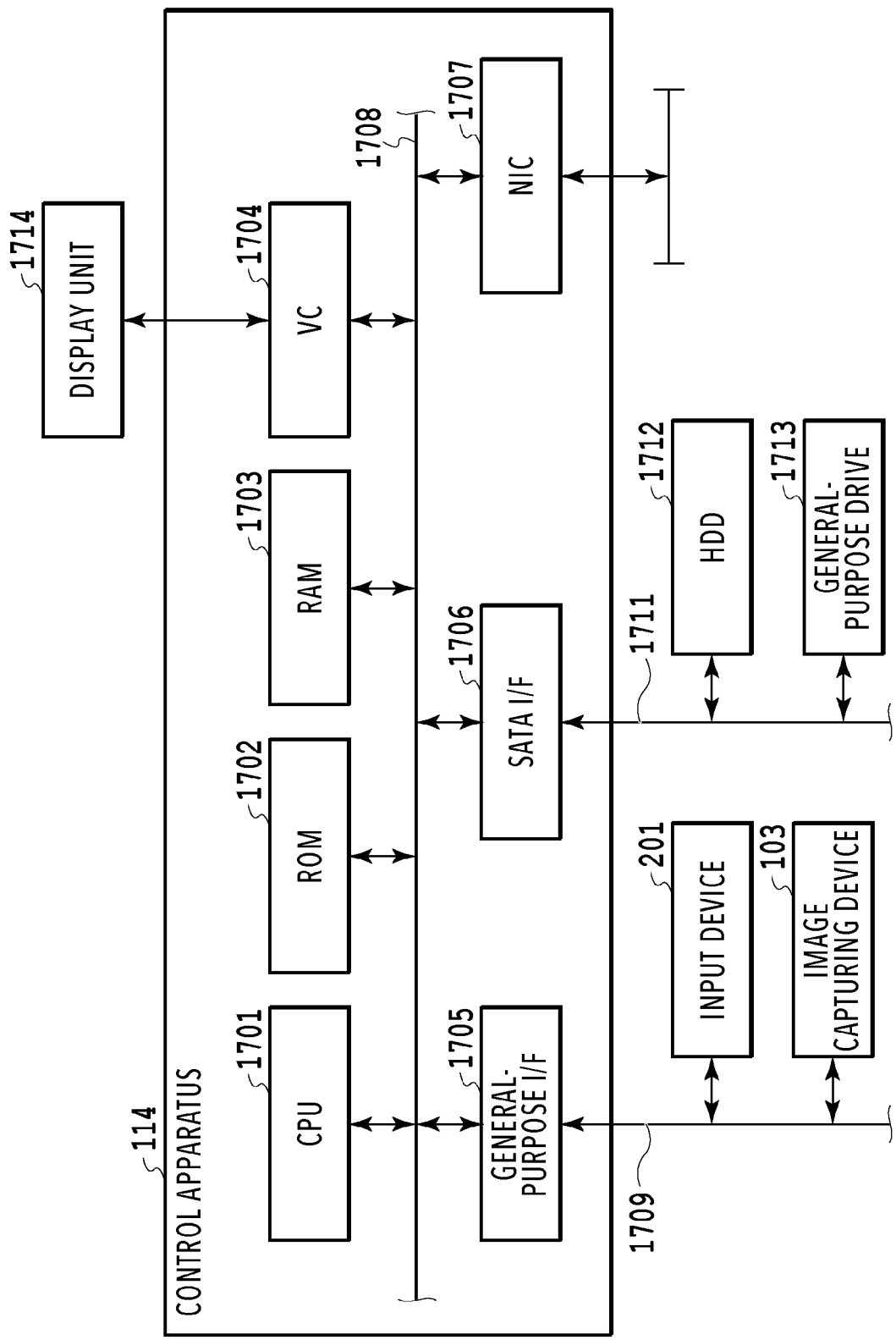
FIG. 17 is a block diagram showing a hardware configuration of the control apparatus according to one embodiment.

Reference numeral 114 denotes a control apparatus configured to control the image capturing device 103 and the illumination device 106 and to perform an example of control to obtain a captured image of the target object 101. FIG. 17 is a block diagram showing a hardware configuration of the control apparatus 114. The control apparatus 114 includes a CPU 1701, a ROM 1702, and a RAM 1703. Moreover, the control apparatus 114 includes a video card (VC) 1704, a general-purpose interface (I/F) 1705, a seral ATA (SATA) I/F 1706, and a network interface card (NIC) 1707.

The CPU 1701 executes an operating system (OS) and various programs stored in the ROM 1702, a hard disk drive (HDD) 1712, and the like while using the RAM 1703 as a work memory. In addition, the CPU 1701 controls respective constituents through a system bus 1708. Here, processing in accordance with flowcharts to be described later will be carried out by loading program codes stored in the ROM 1702, the HDD 1712, and the like into the RAM 1703 and causing the CPU 1701 to execute the program codes.

A display unit 1714 is connected to the VC 1704. An input device 201 such as a mouse and a keyboard, the image capturing device 103, and the illumination device 106 are connected to the general-purpose I/F 1705 through a serial bus 1709. The HDD 1712 and a general-purpose drive 1713 used for reading and writing in various storage media are connected to the SATA I/F 1706 through a serial bus 1711. The NIC 1707 inputs and output information to and from an external device.

The CPU 1701 can use the HDD 1712 and the various storage media mounted on the general-purpose drive 1713 as storage spaces for various data. The CPU 1701 can display a graphical user interface (GUI) offered by a program on the display unit 1714, and receive input such as a user instruction to be accepted by way of the input device 201.

Note that the control apparatus 114 is not limited only to a PC. The control apparatus 114 may be a microcomputer embedded as part of an image processing device, for example.

Figure 2:
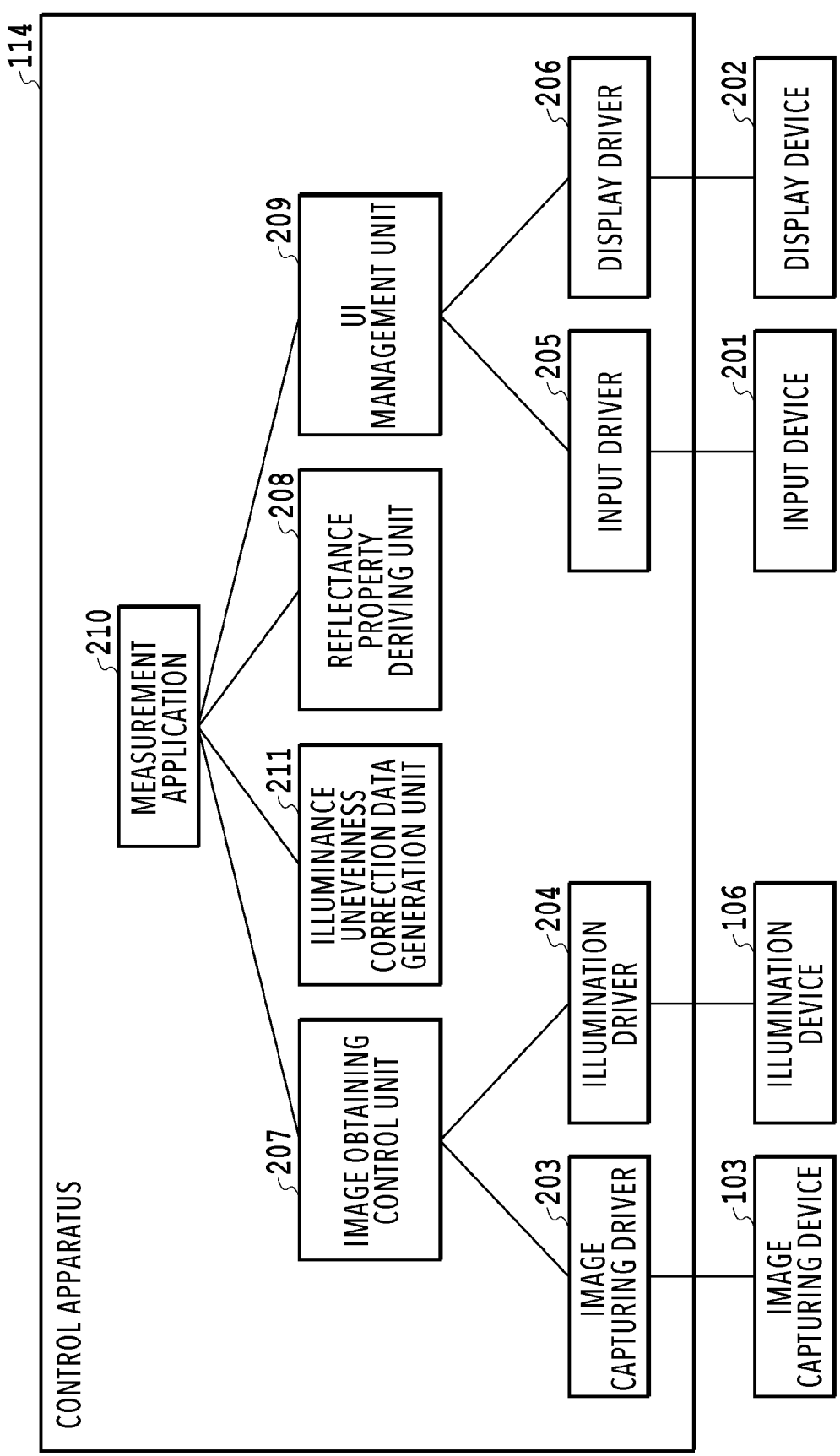
FIG. 2 is a block diagram showing a functional configuration of a control apparatus according to one embodiment.

FIG. 2 is a block diagram showing a functional configuration of the control apparatus 114. Reference numeral 201 denotes the input device that accepts operations of a user, which is a device such as a keyboard, a mouse, and the like. Meanwhile, reference numeral 202 denotes a display device that displays contents inputted by the user, image capturing conditions, and an image capturing result to the user. The display device 202 is a device such as a liquid crystal monitor. Neither the input device 201 nor the display device 202 is illustrated in FIG. 1A. An image capturing driver 203 is a group of commands for controlling the image capturing device 103, which includes a group of commands for transmission from the control apparatus 114 to the image capturing device 103. Meanwhile, an illumination driver 204 is a group of commands for controlling the illumination device 106, which includes commands to turn the point light sources 107 on and off one by one. Likewise, an input driver 205 is a group of commands for controlling the input device 201, and a display driver 206 is a group of commands for controlling the display device 202.

An image obtaining control unit 207 is a group of commands for carrying out a series of processing to obtain captured image data by sending commands to the image capturing driver 203 and the illumination driver 204. A reflectance property deriving unit 208 is a group of commands for deriving reflectance property information on the target object 101 from captured image data obtained by the image obtaining control unit 207. Meanwhile, a UI management unit 209 is a group of commands of user interface functions to carry out processing to manage information inputted to the input device 201 by the user, to display a measurement result on the display device 202, and the like. In the meantime, an illuminance unevenness correction data generation unit 211 is a group of commands for generating illuminance unevenness correction data. A measurement application 210 is a group of commands for interlocking the groups of commands of the image obtaining control unit 207, the reflectance property deriving unit 208, the UI management unit 209, and the illuminance unevenness correction data generation unit 211 with one another so as to function as a single measurement application.

Figure 3:
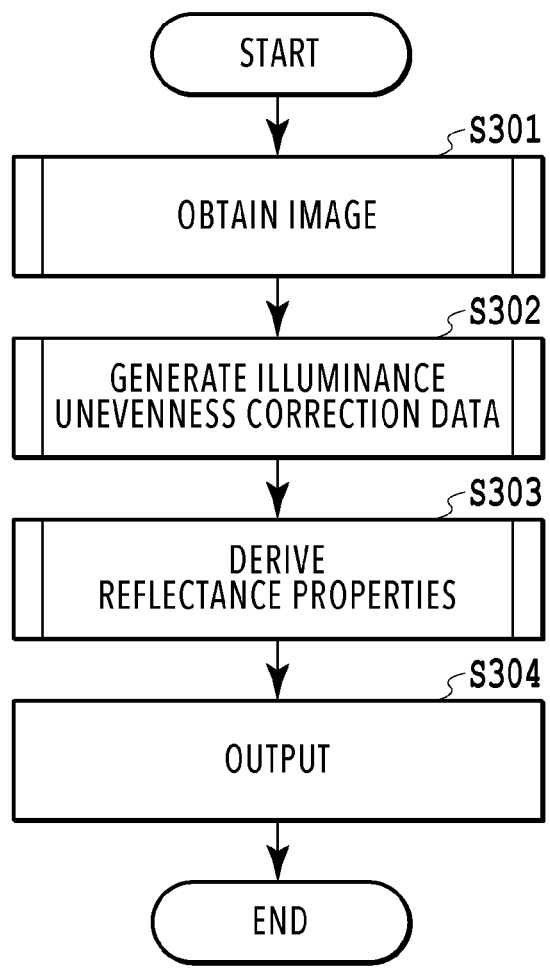
FIG. 3 is a flowchart showing processing of a measurement application according to one embodiment.

FIG. 3 is a flowchart showing a flow of processing of the measurement application 210. In the following description, each step (process) is expressed by prefixing S to each code.

In S301, the measurement application 210 executes a series of processing to obtain captured images by capturing images of the target object 101 with the image capturing device 103 while illuminating the target object 101 with the illumination device 106 by using the group of commands of the image obtaining control unit 207. Details of this step will be described later.

Next, in S302, the measurement application 210 generates the illuminance unevenness correction data by processing captured images of a white plate serving as a reference object obtained in S301. Details of this step will be described later.

Next, in S303, the measurement application 210 obtains reflectance property data on the target object 101 by carrying out processing while using the captured images obtained in S301 and the illuminance unevenness correction data generated in S302. Details of this step will be described later.

Lastly, in S304, the measurement application 210 displays the reflectance property data on the target object 101 derived in S303 on the display device 202, and terminates the processing. In embodiments of the present disclosure, the processing in S304 is not limited only to the above-mentioned processing. In other embodiments, for example, the processing in S304 may be designed to record the reflectance property data on the target object 101 directly into a not-illustrated hard disk, a not-illustrated flash memory, or the like instead of displaying the data on the display device 202.

Figure 4:
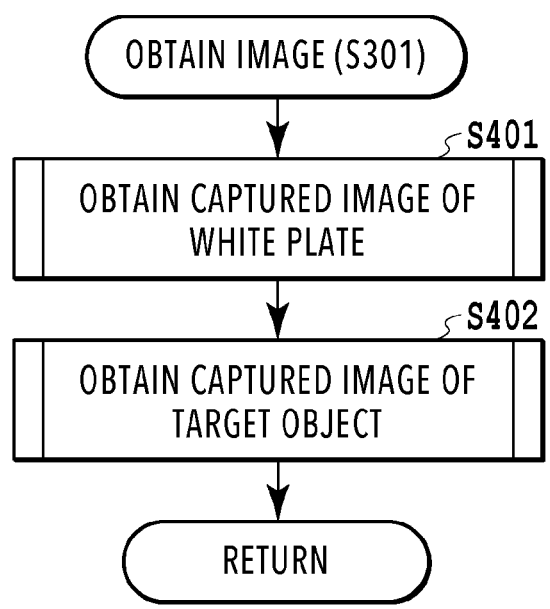
FIG. 4 is a flowchart showing processing to obtain a captured image according to one embodiment.

FIG. 4 is a flowchart for explaining a detailed flow of the image obtaining step S301. This embodiment is designed to obtain illuminance of each position on the surface of the target object 101. To this end, an image of a white plate serving as a reference object is captured apart from the image capturing of the target object 101. The illuminance at each position on the surface of the target object 101 is derived based on a difference between a pixel value of a measurement target image obtained by capturing an image of the target object and a pixel value of a reference image obtained by capturing an image of the white plate being the reference object. Preferably, the white plate to be used as the reference object has an even color, low specularity, and high diffusiveness.

In S401, the measurement application 210 obtains a captured image of the white plate. Details of this step will be described later.

In S402, the measurement application 210 obtains a captured image of the target object 101. Details of this step will be described later. Note that the luminance of each point light source 107 changes with time but does not depend on the order. Accordingly, it is preferable to set a small time difference between S401 and S402. Meanwhile, the order of the steps may be inverted.

Figure 5A:
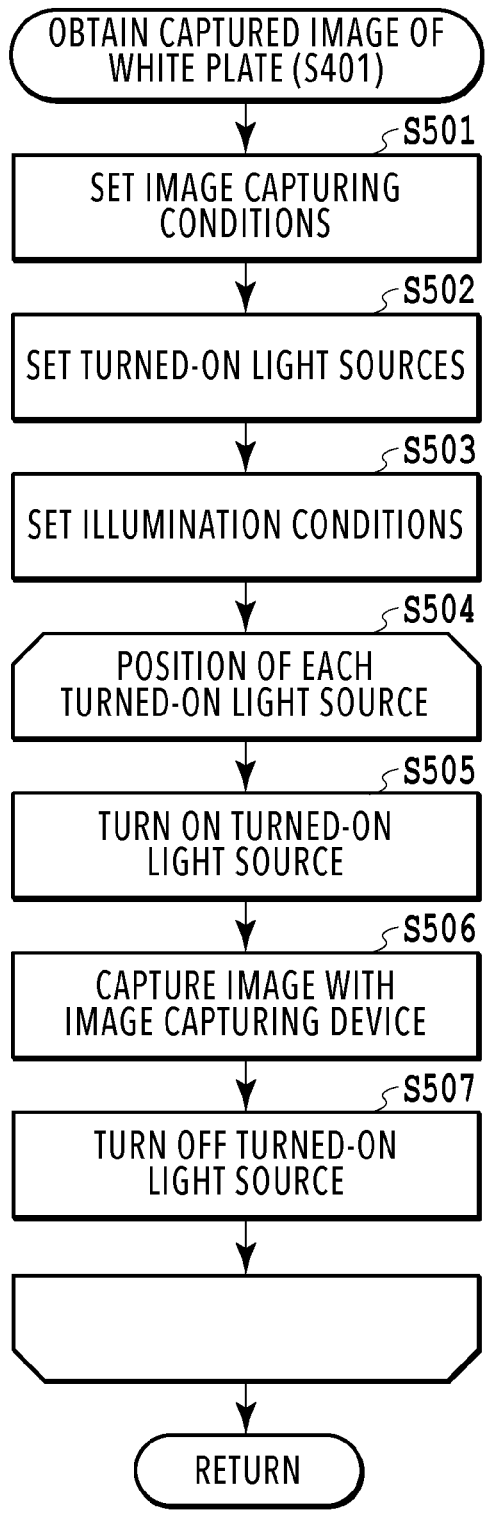
FIG. 5A is another flowchart showing the processing to obtain the captured image according to one embodiment.

FIG. 5A is a flowchart for explaining a detailed flow of S401. In S401, the processing shown in FIG. 5A takes place after placing the white plate on the fixture 102.

In S501, the measurement application 210 sets image capturing conditions applicable to the image capturing device 103 based on user input by using the group of commands of the UI management unit 209. The image capturing conditions to be set in this step include a shutter speed, ISO sensitivity, and the like.

In S502, the measurement application 210 obtains turned-on light source information to designate the point light sources 107 to be used out of the point light sources 107 provided to the illumination device 106 by using the group of commands of the UI management unit 209. This turned-on light source information may be obtained based on the user input while displaying a front view of the illumination device 106 on the UI and allowing the user to designate which point light sources 107 are to be used for capturing the image of the white plate. Alternatively, the turned-on light source information stored in a storage unit of the control apparatus 114 may be obtained instead.

Figure 6:
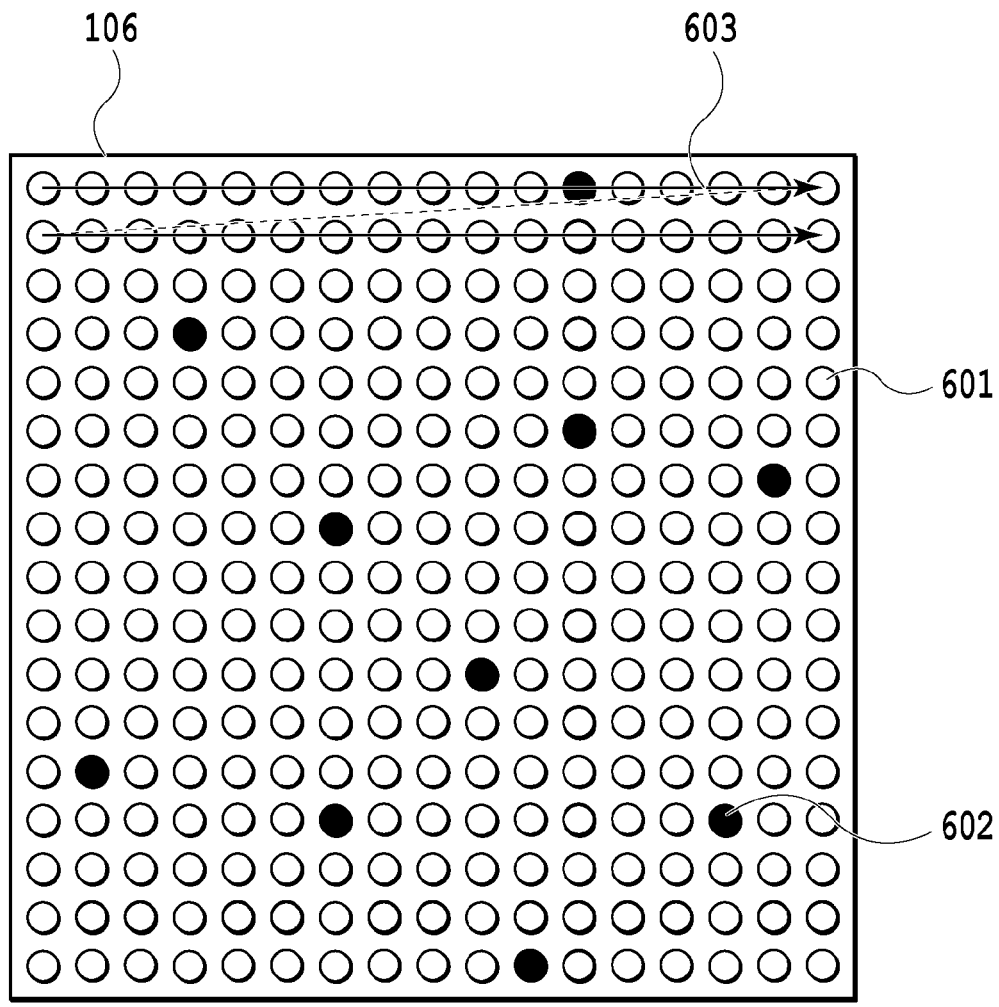
FIG. 6 is a schematic diagram for explaining turned-on light sources used for capturing an image of a white plate according to one embodiment.

FIG. 6 shows a schematic diagram for explaining the light sources of the illumination device 106. Each white circle 601 in FIG. 6 indicates a point light source out of the point light sources 107, which is not to be turned on in the case of capturing the image of the white plate. Each black circle 602 therein indicates a point light source out of the point light sources 107, which is to be turned on in the case of capturing the image of the white plate. The user may freely select the turned-on light sources 602 out of the point light sources 107, which are to be turned on in the case of capturing the image of the white plate. Meanwhile, in order to identify positions of the turned-on light sources 602 used in the case of capturing the image of the white plate, a label j serving as an identifier is used for every point light source 107. As shown in FIG. 6, for example, the labels j may be allocated in accordance with a method of allocating integers sequentially in a horizontal direction from a point light source at an upper left corner to a point light source at a right end, and repeating this allocation while stepping down line by line. The method of allocating the labels may apply any allocation method as long as the labels thus allocated can specify the positions of the respective point light sources 107. Two-dimensional labels (j,k) configured to separately define positions in a longitudinal direction and a lateral direction may be used instead.

In S503, the measurement application 210 sets illumination conditions that are required for capturing the image of the white plate. The illumination conditions to be set in this step include the order of turning on the respective turned-on light sources 602 to be used, lighting time, and the like.

S504 is loop processing to carry out S505 to S507 every time each of the turned-on light sources 602 is turned on. The loop processing is repeated as many times as the number of the turned-on light sources 602.

In S505, the measurement application 210 turns on the designated light source based on the illumination conditions set in S503 by using the illumination driver 204 through the image obtaining control unit 207.

In S506, the measurement application 210 captures the image of the white plate in the state of turning on the point light sources based on the image capturing conditions set in S501 by using the image capturing driver 203 through the image obtaining control unit 207.

In S507, the measurement application 210 turns off the designated light source based on the illumination conditions set in S503 by using the illumination driver 204 through the image obtaining control unit 207.

The processing returns to S504 in the case where any of the unused turned-on light sources 602 remains, and S505 to S507 are carried out by changing the turned-on light source 602 to be used. As described above, the images of the white plate are captured any number of times while changing the turned-on light sources 602 of the illumination device 106.

Figure 5B:
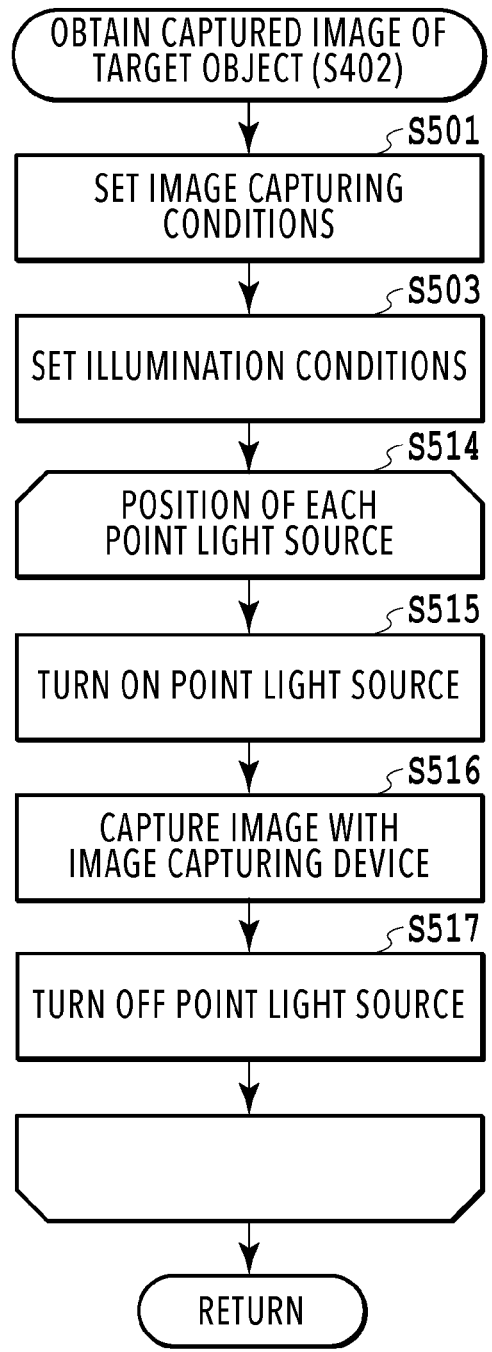
FIG. 5B is still another flowchart showing the processing to obtain the captured image according to one embodiment.

FIG. 5B is a flowchart for explaining a detailed flow of S402. In S402, the processing shown in FIG. 5B takes place after placing the target object 101 on the fixture 102. The target object 101 to be placed is fixed while adjusting the position of the fixture 102 such that the position of the surface of the target object 101 coincides with the corresponding position of the surface of the white plate fixed in S401.

In S402, the object to capture the image is different. Moreover, S402 is also different in that this step does not include the setting of the turned-on light sources equivalent to S502. In the meantime, in S501 and S503, the measurement application 210 sets image capturing conditions and illumination conditions concerning the target object 101 as with S401. S514 is loop processing to carry out S515 to S517 every time each of the point light sources 107 is turned on. The loop processing is repeated as many times as the number of the point light sources 107.

Figure 7:
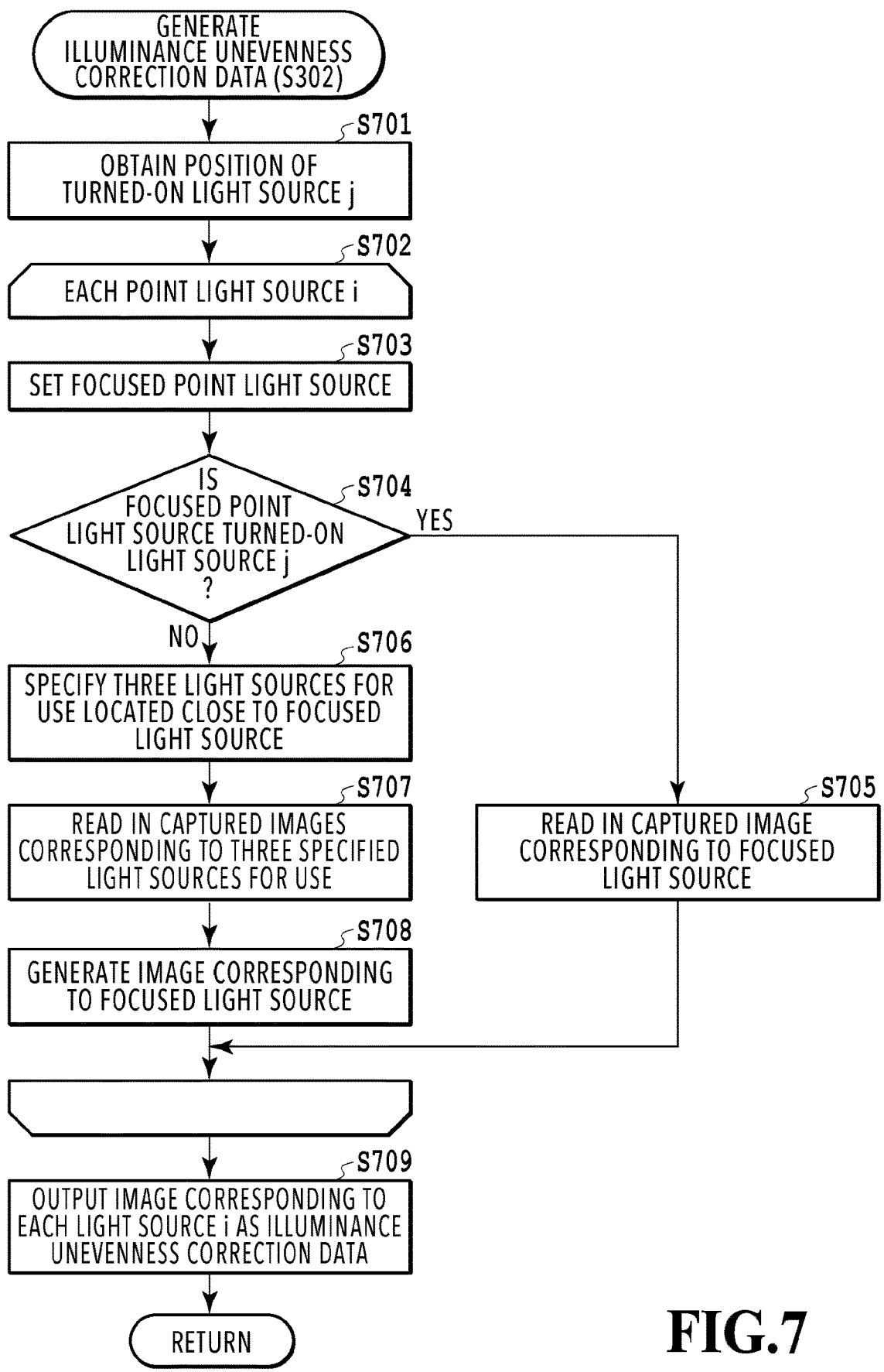
FIG. 7 is a flowchart showing processing to generate illuminance unevenness correction data according to one embodiment.

FIG. 7 is a flowchart showing a more detailed flow of the illuminance unevenness correction data generating step S302. In this illuminance unevenness correction data generating step, the captured image of the white plate captured in in S401 is read in so as to generate illuminance unevenness correction data $REF_i(u, v)$ on the position of each of the turned-on light sources 602 used at the time of capturing the image of the target object 101. Here, codes u and v are an index in the lateral direction and an index in the longitudinal direction, respectively, for identifying each pixel in the image. Since this embodiment uses the area sensor that covers 4096×3000 pixels, code u assumes an integer value in a range from 1 to 4096 while code v assumes an integer value in a range from 1 to 3000. Meanwhile, code i is the label for identifying the position of each point light source 107 used for capturing the image of the target object 101.

First, in S701, the measurement application 210 obtains a label j for identifying a position of each turned-on light source 602 used for capturing the image of the white plate set in S503 as turned-on light source information in order to specify the position of the turned-on light source 602 used at the time of capturing the image of the white plate.

S702 is loop processing to carry out S703 to S708 for each of the focused point light sources 107.

First, in S703, the measurement application 210 sets the point light source 107i to be focused on.

In S704, the measurement application 210 refers to the turned-on light source information read in S701 and determines whether or not the focused point light source 107i is the turned-on light source 602 used for capturing the image of the white plate. The processing proceeds to S705 in the case where the focused point light source 107i turns out to be the turned-on light source 602 used for capturing the image of the white plate in S704. The processing proceeds to S706 in the case where the focused point light source 107i turns out not to be the turned-on light source 602 used for capturing the image of the white plate.

In S705, the measurement application 210 reads in the captured image captured by using the focused point light source 107i out of the captured images of the white plate which are captured in S401.

In S706, the measurement application 210 specifies three turned-on light sources 602 among the turned-on light sources 602 used for capturing the image of the white plate, which are located close to the focused point light source 107i. Specifically, the measurement application 210 specifies the three turned-on light sources 602 located close to the focused point light source 107i by reading in position information on all the point light sources 107 stored in position information on the light sources, the image capturing device, and the captured images, and deriving distances of the turned-on light sources 602 from the focused point light source 107i.

In S707, the measurement application 210 reads in three captured images of the white plate obtained by capturing the images while using the three turned-on light sources 602, respectively, that are specified in S706 out of the turned-on light sources 602 used for capturing the images of the white board.

In S708, the measurement application 210 generates an image corresponding to the focused point light source 107i by using the three captured images read in S707. Specifically, the distances of the three identified turned-on light source 602 from the focused point light source 107i are derived to begin with. Then, the measurement application 210 derives pixel values for respective pixels of the image to be generated by carrying out interpolation processing while using the pixel values corresponding to the three captured images read in S707 and weights corresponding to the derived distances. The image corresponding to the focused point light source 107i is generated by deriving the pixel values in this way regarding all the pixels.

Lastly, in S709, the measurement application 210 outputs images of the white plate corresponding to the respective focused point light sources 107i as luminance values $REF_i$ (u, v) of the respective pixels of the captured image of the white plate, which represent the illuminance unevenness correction data.

Figure 8:
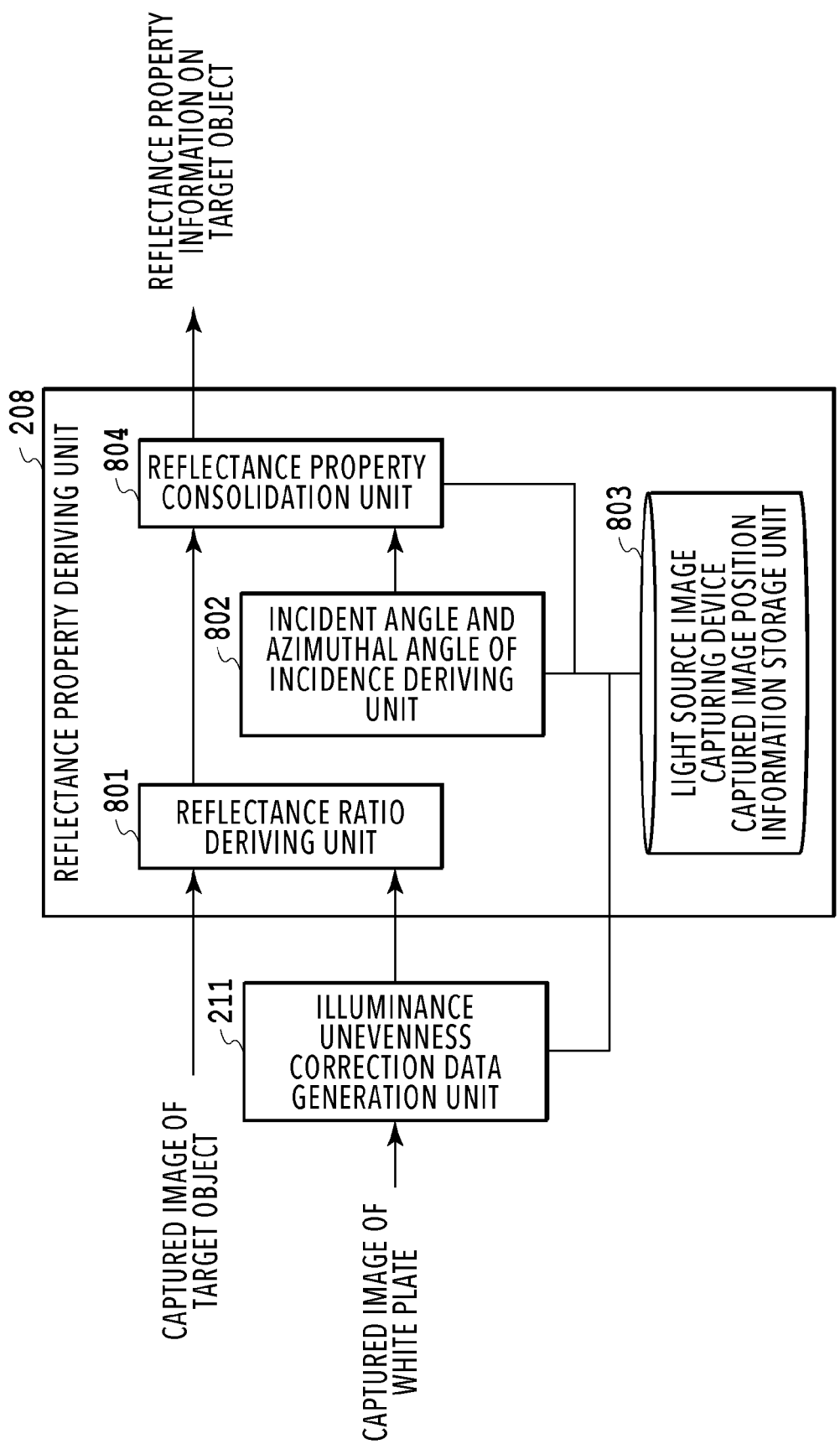
FIG. 8 is a block diagram showing a functional configuration of a reflectance property obtaining unit according to one embodiment.
Figure 9:
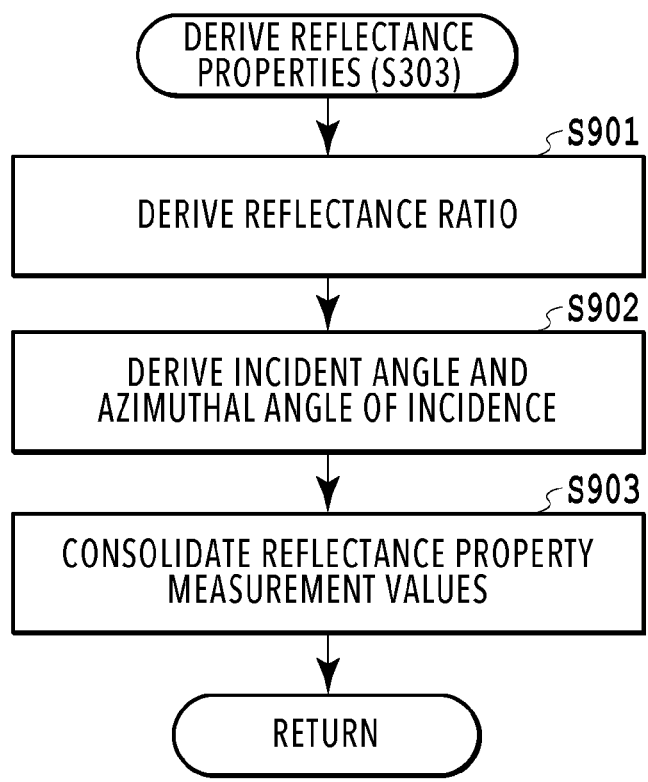
FIG. 9 is a flowchart showing processing to derive reflectance properties according to one embodiment.

FIG. 8 is a block diagram for explaining a configuration of more detailed functions of the reflectance property deriving unit 208. Meanwhile, FIG. 9 is a flowchart for explaining a more detailed flow of the reflectance property deriving step S303.

First, in S901, the reflectance property deriving unit 208 reads in a luminance value $OBJ_i$ (u, v) of each pixel in the captured image of the target object 101 and the luminance value $REF_i$ (u, v) of each pixel in the captured image of the white plate for each of the point light sources 107 that are turned on while using a reflectance ratio deriving unit 801. The luminance value $REF_i$ (u, v) is the illuminance unevenness correction data for each focused point light source 107i generated in the illuminance unevenness correction data generating step S302. Then, the reflectance ratio deriving unit 801 derives a reflectance ratio $R_i$ (u, v) for each focused point light source 107i by using the following formula. Specifically, the reflectance ratio $R_i$ (u, v) is a value obtained by dividing the luminance value $OBJ_i$ (u, v) of each pixel in the captured image of the target object 101 by the luminance value $REF_i$ (u, v) of each pixel in the captured image of the white plate.

$$R_i(u,v)=OBJ_i(u,v)/REF_i(u,v) \qquad \text{[Mathematical 1]}$$

Note that the reflectance ratio information $R_i$ (u, v) for each point light source derived in this step does not contain information on the incident angle α and the reflected angle β.

The incident angle α on the white plate or the target object 101, which is incident from the point light source 107 on each pixel position (u, v) of the captured image, varies because a position (x, y, z) in real space corresponding to the pixel position (u, v) of the captured image is different depending on the pixel position (u, v). Moreover, the incident angle α on the white plate or the target object 101 also varies depending on a position i of the point light source 107 to be turned on. On the other hand, regarding the reflected angle β, the reflected angle β and an azimuthal angle of reflection (which correspond to a zenithal angle and an azimuthal angle in a spherical coordinate system) are (45°, 0°) irrespective of the pixel position (u, v) of the captured image because the image is captured by using the telecentric lens 104. In the subsequent S902, the incident angle α and an azimuthal angle of incidence are derived for each pixel position (u, v) of the captured image.

In S902, the reflectance property deriving unit 208 derives the incident angle α and the azimuthal angle of incidence (θ (u, v), φ (u, v)) at each pixel position (u, v) of the captured image by using an incident angle and azimuthal angle of incidence deriving unit 802. The incident angle and azimuthal angle of incidence deriving unit 802 reads in setting values held in a light source image capturing device captured image position information storage unit 803 in order to derive the incident angle α and the azimuthal angle of incidence. The setting values to be read herein include designed values at a position (x (u, v), y (u, v), z (u, v)) in real space corresponding to each pixel position (u, v) in the captured image, and a position ($x_{Li}$, $y_{Li}$, $z_{Li}$) in real space of each point light source 107. Then, the incident angle and azimuthal angle of incidence deriving unit 802 derives the incident angle and the azimuthal angle of incidence (θ (u, v), φ (u, v)) at each pixel position (u, v) of the captured image by using the following formulae.

$$L_i(u,v,1)=x_{Li}(u,v)-x(u,v)$$

$$L_i(u,v,2)=y_{Li}(u,v)-y(u,v)$$

$$L_i(u,v,2)=z_{Li}(u,v)-z(u,v)$$

$$\theta_i(u,v)=a\cos(L_i(u,v,3)/(\sqrt{L_i(u,v,1)^2+L_i(u,v,2)^2+L_i(u,v,3)^2})$$

$$\varphi_i(u,v)=\text{sign}(L_i(u,v,2))*a\cos(l_i(u,v,1)/(\sqrt{L_i(u,v,1)^2+L_i(u,v,2)^2}) \qquad \text{[Mathematical 2]}$$

Here, a cos( ) is an inverse function of cos( ) while sign ( ) is a sign function.

In S903, the reflectance property deriving unit 208 outputs reflectance property information on the target object 101 by using a reflectance property consolidation unit 804. To this end, the reflectance property consolidation unit 804 reads in the reflectance ratio $R_i$ (u, v) derived in S901, and the incident angle and the azimuthal angle of incidence (θ (u, v), φ (u, v)) derived in S902. Meanwhile, the reflectance property consolidation unit 804 reads in the designed values at the position (x (u, v), y (u, v), z (u, v)) in real space corresponding to each pixel position (u, v) in the captured image held in the light source image capturing device captured image position information storage unit 803. Here, the reflectance property information to be outputted is information that enumerates the incident angle and the azimuthal angle of incidence (θ, φ), the reflection angle and the azimuthal angle of reflection (45°, 0°), and the reflectance ratio $R_i$ (u, v) at each position (x, y, z) in space.

By carrying out the above-described processing control, it is possible to obtain the reflectance properties of the target object in the vicinity of the specular reflection angle at high accuracy with a reduced number of times of capturing the images of the reference object for illuminance correction as compared to the conventional measurement method that requires the image capturing while changing the positions of the image capturing device.

According to Japanese Patent Laid-Open No. 2007-219715, the incident angle and the reflection angle vary depending on the position on the target object, and it is therefore necessary to capture the images of the white plate while changing a turn-on position of the illumination device as well as the position of the image capturing device. On the other hand, the images of the white plate are captured by using the telecentric lens 104 in this embodiment. Accordingly, the image capturing device 103 does not have to carry out the measurement while changing its position. As a consequence, it is possible to reduce the number of times of image capturing since the measurement only requires changes in position of the point light source 107. Moreover, the illumination device 106 does not include any mechanically movable parts. As a consequence, it is possible to reduce an interval between image capturing operations and thus to carry out continuous image capturing at a high speed.

Furthermore, some of the point light sources 107 are selected as the turned-on light sources 602 used for capturing the images for illuminance unevenness correction, and the image capturing is carried out by using the selected turned-on light source 602. Then, the illuminance unevenness correction data is generated by using the captured images of the white plate. Since it is not necessary to turn on all the point light sources 107, the number of times of image capturing operations for correcting the illuminance can be reduced further.

In this embodiment, the optical system on the image capturing device side is formed into the telecentric optical system while the optical system on the illumination side is formed into the non-telecentric optical system. Now, a supplementary description will be given of a case of forming the optical system on the illumination side into the telecentric optical system. In this case, the target object will be irradiated with the light in the same direction irrespective of the position on the target object. As a consequence, while the light at the incident angle α of 45° is available, it is difficult to obtain the reflectance ratios of the light in the vicinity of the incident angle α of 45° such as 43° and 47°, and the light with variable incident angles α in a range from 10° to 20° around the 45°.

Accordingly, in this embodiment, the optical system on the illumination device side is formed into the non-telecentric optical system so as to reduce the pitch of arrangement of the point light sources 107 on the illumination device 106. This makes it possible to measure the reflectance properties with high angular resolution and to obtain the reflectance ratios of the light in the vicinity of the incident angle α of 45°.

Meanwhile, this embodiment provides one image capturing device and multiple point light sources so as to obtain two-dimensional distribution of the reflectance ratios R at the incident angle α in the vicinity of 45° and at the reflected angle β of 45°. Now, a supplementary description will be given of a case of providing one light source and multiple image capturing devices instead. In order to capture the images efficiently with this configuration, the multiple image capturing devices have to be arranged densely. However, it is difficult to arrange the image capturing devices densely like the point light sources 107 in this embodiment. As a consequence, the available angular resolution of the reflectance properties is significantly deteriorated.

Here, the two-dimensional distribution of the reflectance ratios R at the incident angle α in the vicinity of 45° and at the reflected angle β of 45° is obtained in this embodiment. The reflectance properties have a feature that the reflectance ratio R does not change even by interchanging the incident light and the reflected light, which is so-called the Helmholtz reciprocity. This is why the information equivalent to the two-dimensional distribution of the reflectance ratios R at the incident angle α of 45° and at the reflected angle β in the vicinity of 45° is available.

Note that this embodiment is not limited only to the above-described method of causing the control apparatus 114 to synchronize the turning on of the respective point light sources 107 of the illumination device 106 with the image capturing by the image capturing device 103. For example, the illumination device 106 may be connected to the image capturing device 103 by using a cable, and the image capturing device 103 may be configured to capture the images simultaneously with the turning on of the illumination device 106 by outputting a signal to control the turning on of the illumination device 106 to the image capturing device 103.

In the meantime, the reflectance property information on the target object 101 derived in S903 is formed from an enormous amount of data. Accordingly, the reflectance property information on the target object 101 may be approximated by using a function while using a reflection model and an optimization technique such as a least-squares method at the same time, and an outcome of approximation may be outputted as parameters of the reflection model. Examples of the reflection model include various publicly known techniques such as the Torrance-Sparrow model and the Phong model. Any of these publicly known techniques is applicable.

Meanwhile, this embodiment is configured to generate the illuminance unevenness correction data after capturing the images of the measurement target object. However, embodiments of the present disclosure are not limited to this configuration. In other embodiments, the illuminance unevenness correction data may be generated after capturing the images of the white plate without capturing the images of the measurement target object, for example. If the positions of the point light sources used at the time of capturing the images of the measurement target object are determined in advance, then the illuminance unevenness correction data only needs to be generated in terms of the predetermined positions of the point light sources. If the positions of the point light sources used at the time of capturing the images of the measurement target object are not determined in advance, the illuminance unevenness correction data may be generated in terms of all of the point light sources.

Second Embodiment

The first embodiment is configured to select the point light sources used for the image capturing for the illuminance unevenness correction, and to capture the images by using the selected point light sources, thereby generating the illuminance unevenness correction data by using the captured images of the white plate. Nonetheless, the user has to designate the point light sources to be used for capturing the images of the white plate in this case.

In a second embodiment, a description will be given of a method of deriving positions of point light sources used in image capturing for illuminance unevenness correction by optimization processing that applies evaluation values based on causes of occurrence of the illuminance unevenness.

Here, a structural configuration of a reflectance property obtaining system and a functional configuration of a control apparatus in the second embodiment are the same as those in the first embodiment, and explanations thereof will be omitted. Instead, a brief description will be given below mainly of different features from the first embodiment.

Figure 10:
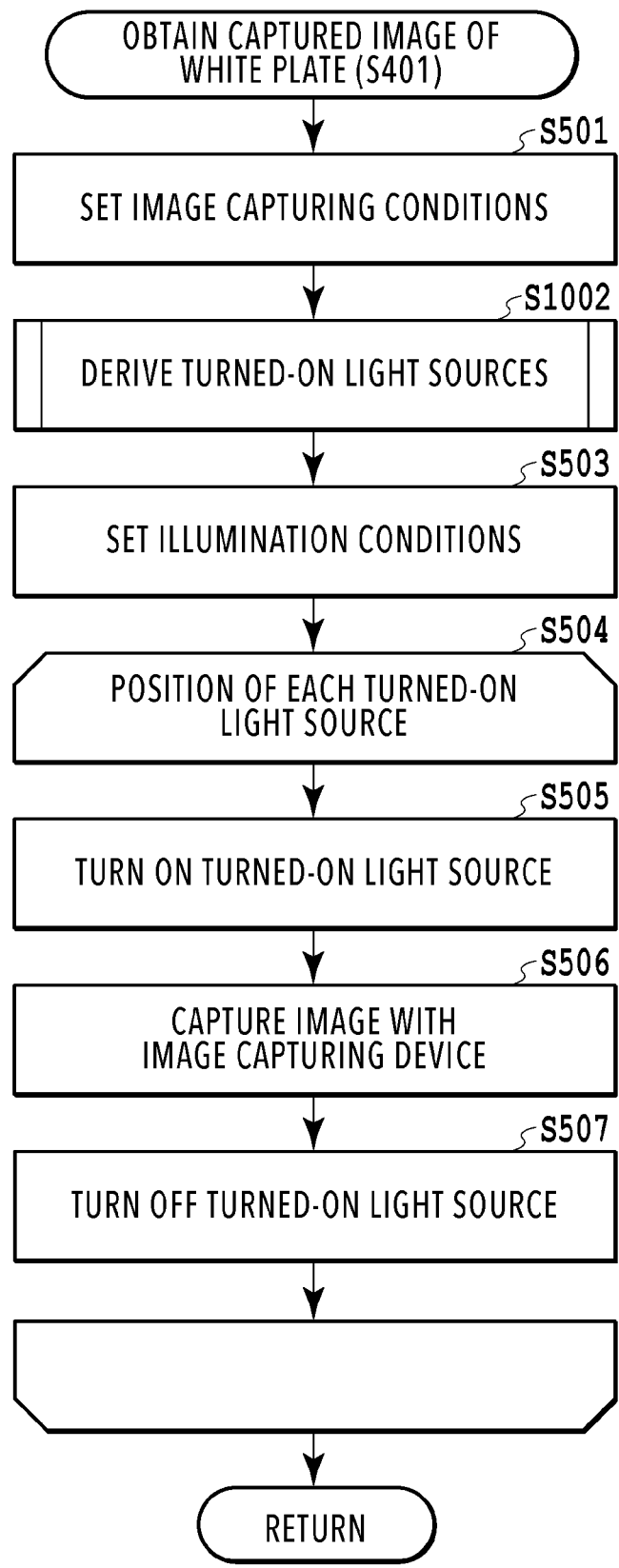
FIG. 10 is a flowchart showing processing to obtain a captured image according to one embodiment.

FIG. 10 is a flowchart for explaining a detailed flow of obtaining the captured images of the white plate in the second embodiment. In this flow chart, the setting of the turned-on light sources is different from S502 of the first embodiment. Accordingly, a description will be given of derivation of the turned-on light sources S1002 that replaces S502.

Figure 11:
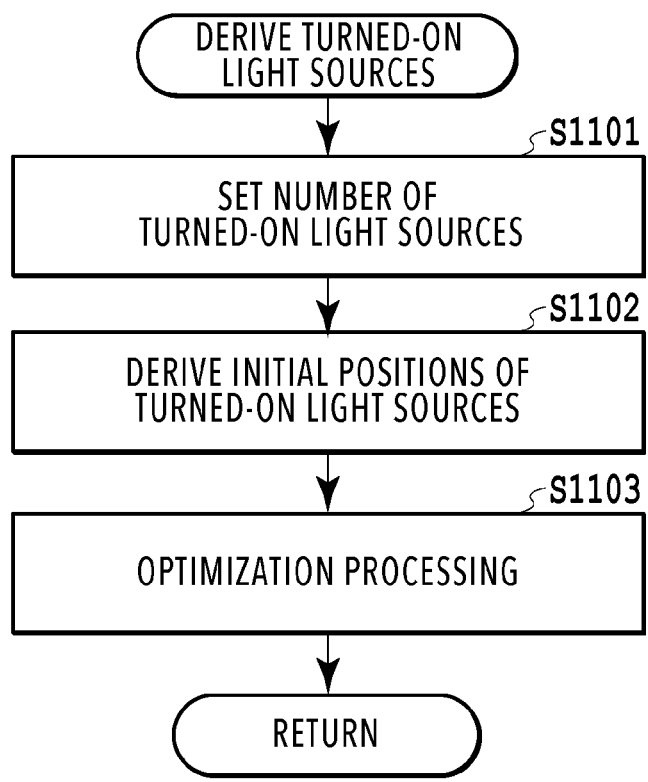
FIG. 11 is a flowchart showing processing to set conditions according to one embodiment.

FIG. 11 is a flowchart for explaining a detailed flow of S1002.

In S1101, the measurement application 210 sets the number of turned-on light sources based on the user input by using the group of commands of the UI management unit 209. Here, the number of turned-on light sources is the number of the point light sources 107 used for capturing the image of the white plate being the reference object. The number of captured images of the white plate becomes less as the number of turned-on light sources is smaller. However, accuracy of the illuminance unevenness correction is reduced. Meanwhile, a predetermined value may be read in instead of allowing the user to select the number of turned-on light sources. In the meantime, the user may be allowed to select quality of the illuminance unevenness correction and the number of turned-on light sources may be set depending on the selected quality. In the case where the user selects the highest quality, for example, the number of turned-on light sources is set to a maximum value. On the other hand, in the case where the user selects the lowest quality, the number of turned-on light sources is set to a minimum value. The maximum value of the number of turned-on light sources is determined by the number of the point light sources 107 provided to the illumination device 106. Meanwhile, the minimum value of the number of turned-on light sources is 2 for the sake of interpolation by the illuminance unevenness correction data generation unit 211.

In S1102, the measurement application 210 derives initial positions of the turned-on light sources so as to satisfy the number of turned-on light sources set in S1101. The initial positions of the turned-on light sources are positions of the turned-on light sources serving as initial values in subsequent optimization processing. The initial positions of the turned-on light sources are preferably dispersed to some extent. The initial positions of the turned-on light sources are determined by using a random number, for instance.

In S1103, the measurement application 210 derives the positions of the turned-on light sources by the optimization processing. Here, a publicly known optimization technique such as the Levenberg-Marquardt method can be used as the optimization processing. In the meantime, a method of determining the evaluation value is important in conducting the optimization processing. In this embodiment, the evaluation values that represent illuminance bias of the point light sources selected from the multiple point light sources in the illumination device are designed based on the causes of occurrence of the illuminance unevenness.

Figure 12A:
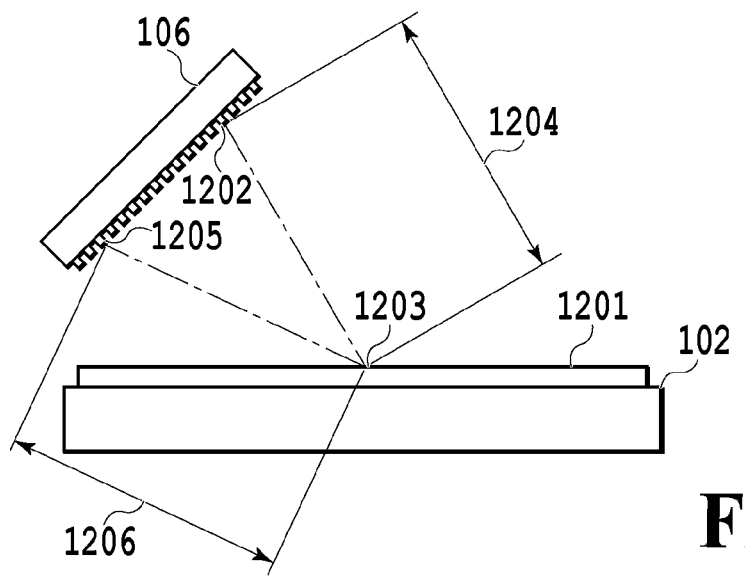
FIG. 12A is a schematic diagram for explaining a cause of occurrence of illuminance unevenness according to one embodiment.
Figure 12B:
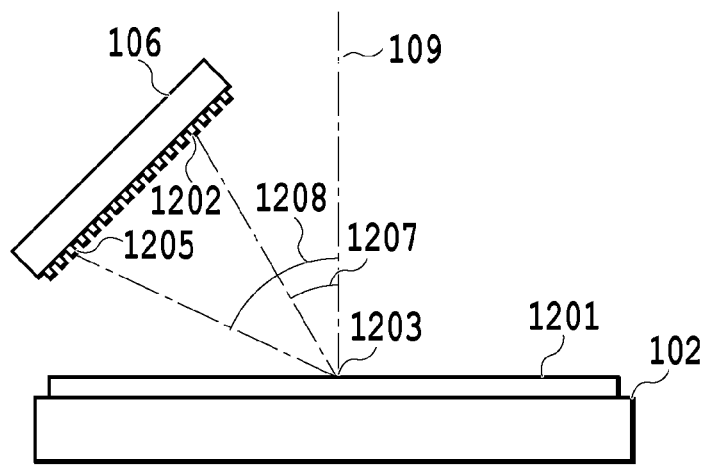
FIG. 12B is a schematic diagram for explaining another cause of occurrence of the illuminance unevenness according to one embodiment.
Figure 12C:
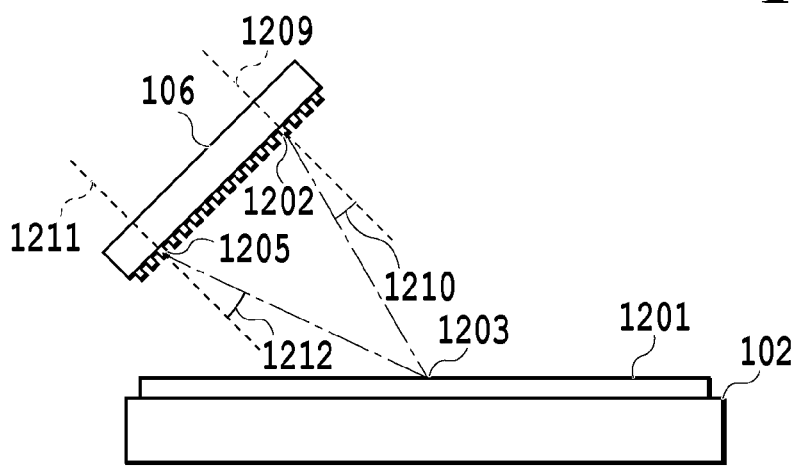
FIG. 12C is a schematic diagram for explaining still another cause of occurrence of the illuminance unevenness according to one embodiment.

The causes of occurrence of the illuminance unevenness will be described to begin with. FIGS. 12A to 12C are schematic diagrams for explaining the causes of occurrence of the illuminance unevenness. There are three causes of occurrence of the illuminance unevenness, namely, 1) a difference in distance to a target object 1201 depending on the position of the light source, 2) a difference in incident angle of light emitted from the position of the light source, and 3) a difference in direction of the target object 1201 viewed from the light source depending on the position of the light source.

FIG. 12A is a schematic diagram for explaining distances from point light sources 1202 and 1205 to a position 1203 on the target object 1201. The target object 1201 is the white plate fixed onto the fixture 102. Reference numerals 1202 and 1205 denote certain point light sources on the illumination device 106, reference numeral 1203 denotes a position of a representative point on the white plate which is a central position in this case, and reference numerals 1204 and 1206 denote distances from the point light sources 1202 and 1205 to the position 1203 of the representative point, respectively. The distance 1204 is assumed to be different from the distance 1206.

The distance from the point light source to the position on the target object varies depending on the position of the point light source and on the position on the target object. In the meantime, the light emitted from the point light source attenuates with the distance. As a consequence, the illuminance varies with a change in distance from the point light source to the position on the target object depending on the position of the point light source.

FIG. 12B is a schematic diagram for explaining incident angles of light emitted from the point light sources 1202 and 1205 to the position 1203 of the representative point on the target object 1201. Reference numeral 1207 denotes an incident angle of the light emitted from the point light source 1202 at the position 1203 of the representative point, and reference numeral 1208 denotes an incident angle of the light emitted from the point light source 1205 at the position 1203 of the representative point, respectively. The incident angle 1207 is different from the incident angle 1208. Meanwhile, illuminance on a certain surface follows the cosine law and is therefore proportional to the cosine of the incident angle of the light. As a consequence, the illuminance varies with a change in incident angle at the position 1203 of the representative point depending on the position of the point light source.

FIG. 12C is a schematic diagram for explaining a change in direction of the position 1203 on the target object 1201 viewed from the point light sources 1202 and 1205 depending on the position of the point light source. Reference numeral 1209 denotes a line which passes through the point light source 1202 and extends perpendicularly to the surface of the illumination device 106 on which the point light source 1202 is located. Reference numeral 1210 denotes an angle formed between the line 1209 and a line that passes through the point light source 1202 as well as the position 1203 of the representative point. Likewise, reference numeral 1211 denotes a line which passes through the point light source 1205 and extends perpendicularly to the surface of the illumination device 106 on which the point light source 1205 is located. Reference numeral 1212 denotes an angle formed between the line 1211 and a line that passes through the point light source 1205 as well as the position 1203 of the representative point. The angle 1210 is different from the angle 1212. As described above, the directions of the position of 1203 of the representative point on the target object viewed from the point light sources 1202 and the 1205 are different from each other. Meanwhile, since the illumination device 106 is the light source of the non-telecentric optical system, the luminance varies depending on the direction of emission of the light from the point light source. As a consequence, the illuminance varies with the difference in direction of emission of the light to the position 1203 of the representative point on the target object viewed from the point light source.

In this embodiment, the positions of the turned-on light sources in the case of capturing the images of the white plate are derived in S1103 by performing the optimization processing while using the evaluation values that are designed to represent the bias of the illuminance of the point light sources selected from the multiple point light sources of the illumination device based on the above-mentioned three causes of occurrence of the illuminance unevenness. Here, the evaluation values may be derived based on one or two out of the three causes of occurrence of the illuminance unevenness. Alternatively, the evaluation values may be derived for each of the causes of occurrence of the illuminance unevenness and then the positions of the turned-on light sources may be derived by using a publicly known multi-objective optimization technique. In this embodiment, a description will be given of methods of optimizing the evaluation values based on every one of the causes of occurrence of the illuminance unevenness.

Figure 13:
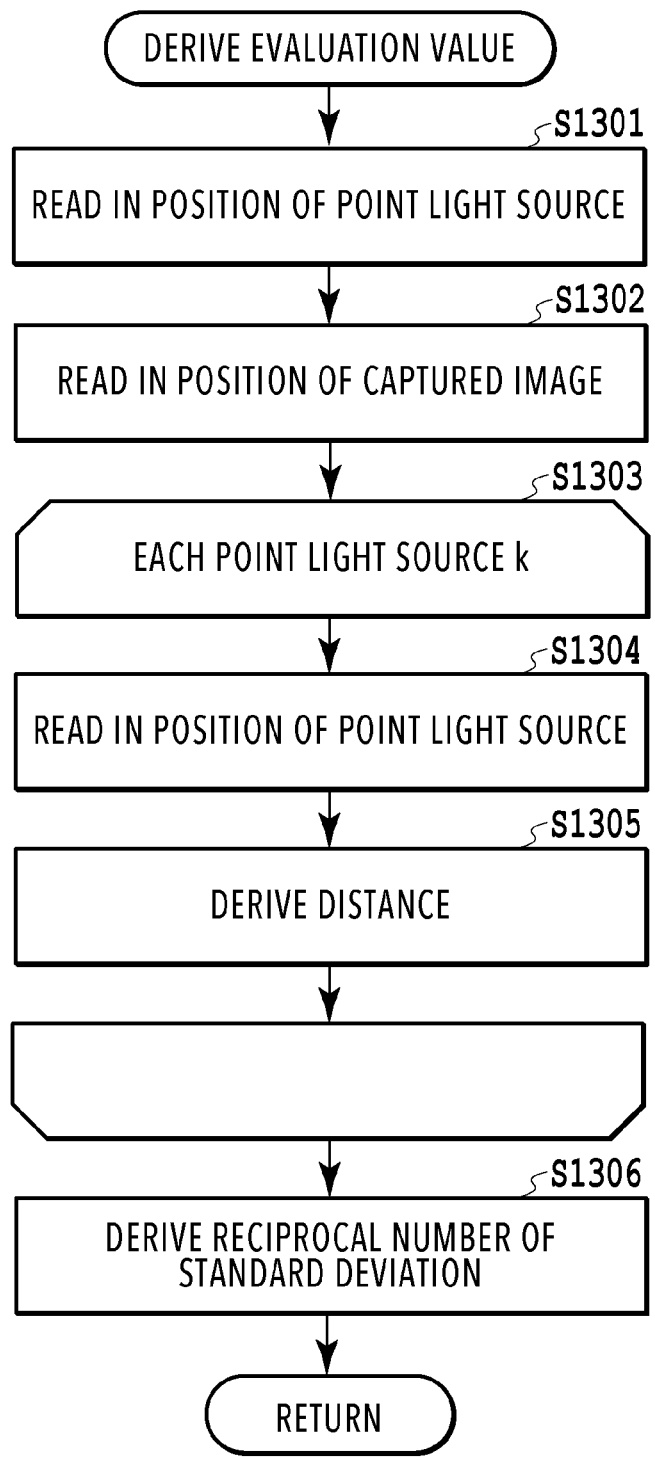
FIG. 13 is a flowchart showing processing to derive an evaluation value based on a distance from a light source to a target object according to one embodiment.

FIG. 13 is a flowchart for explaining the method of deriving an evaluation value based on the distance from the point light source to the target object.

In S1301, the measurement application 210 reads in a label k for specifying a position of the point light source.

Next, in S1302, the measurement application 210 reads in designed values at the position (x (u, v), y (u, v), z (u, v)) in real space corresponding to each pixel position (u, v) in the captured image, which are held in the light source image capturing device captured image position information storage unit 803.

S1303 is loop processing to carry out S1304 and S1305 for each label k of the position of the point light source read in S1301.

In S1304, the measurement application 210 reads in designed values at a position ($x_{Lk}$, $y_{Lk}$, $z_{Lk}$) in real space corresponding to a focused point light source 107k, which are held in the light source image capturing device captured image position information storage unit 803.

In S1305, the measurement application 210 derives a distance $L_k$ from the point light source 107 to the position of the representative point on the target object. The position (x (u, v), y (u, v), z (u, v)) in real space corresponding to the pixel position (u, v) in the captured image and the position ($x_{Lk}$, $y_{Lk}$, $z_{Lk}$) in real space corresponding to the focused point light source 107k are used to derive the distance $L_k$. The position (x (u, v), y (u, v), z (u, v)) and the position ($x_{Lk}$, $y_{Lk}$, $z_{Lk}$) are values read in S1302 and S1303. In this embodiment, the position of the representative point on the target object is defined as a center point of the captured image. In other words, the distance is derived on the premise that (x (u, v), y (u, v), z (u, v))=(0, 0, 0) holds true. Here, instead of the method of using the representative point, the distances may be derived in terms of all the pixels in the captured image and average values thereof may be defined as the distance $L_k$ from the focused point light source 107k to the target object.

The processing from S1304 to S1305 is carried out for each label k of the position of the turned-on light source. The processing proceeds to S1306 upon completion of the processing concerning all of the point light sources 107.

In S1306, the measurement application 210 derives a standard deviation of all the distances $L_k$ thus derived, and outputs a reciprocal number of the derived standard deviation as the evaluation value. Here, the reciprocal number of the derived standard deviation is outputted as the evaluation value in order to derive the position of the turned-on light source having the largest standard deviation of the distance $L_k$ from the point light source to the position of the representative point on the target object by optimizing the evaluation value. In this way, the positions of the turned-on light sources are derived in such a way as to disperse the distances from the turned-on light sources to the target object. This makes it possible to perform the illuminance unevenness correction at high accuracy with a small number of the turned-on light sources.

Figure 14:
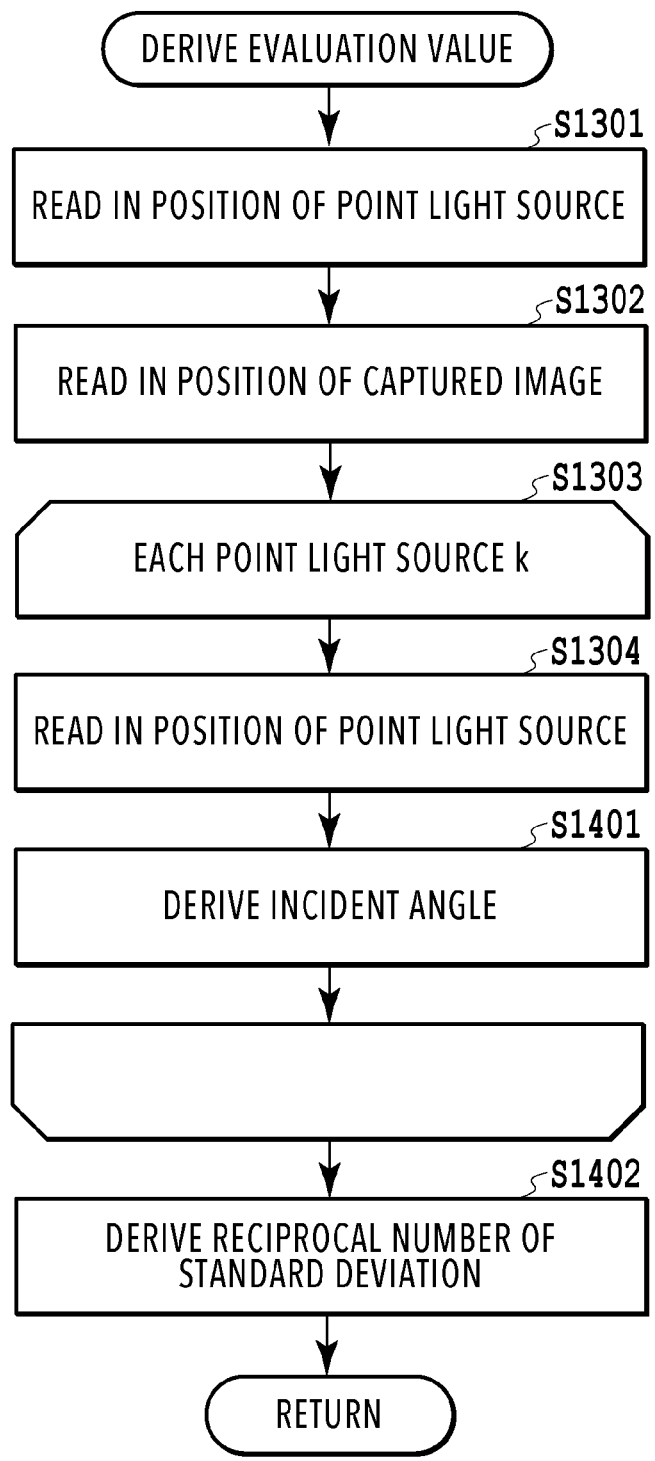
FIG. 14 is a flowchart showing processing to derive an evaluation value based on an incident angle according to one embodiment.

FIG. 14 is a flowchart for explaining the method of deriving an evaluation value based on the incident angle. Here, S1401 and S1402 are different from the flowchart in FIG. 13. Therefore, explanations of the rest of S1301 to S1304 will be omitted herein.

In S1401, the measurement application 210 derives an incident angle and an azimuthal angle of incidence ($\theta_k$, $\phi_k$). The position (x (u, v), y (u, v), z (u, v)) in real space corresponding to the pixel position (u, v) in the captured image and the position ($x_{Li}$, $y_{Li}$, $z_{Li}$) in real space of the focused point light source 107k are used to derive the incident angle and the azimuthal angle of incidence ($\theta_k$, $\phi_k$). The position (x (u, v), y (u, v), z (u, v)) and the position ($x_{Li}$, $y_{Li}$, $z_{Li}$) are values read in S1302 and S1303. In this embodiment, the position of the representative point on the target object is defined as the center point of the captured image. In other words, the incident angle and the azimuthal angle of incidence are derived on the premise that (x (u, v), y (u, v), z (u, v))=(0, 0, 0) holds true. Here, instead of the method of using the representative point, the incident angles and the azimuthal angles of incidence may be derived in terms of all the pixels in the captured image and average values thereof may be defined as the incident angle and the azimuthal angle of incidence ($\theta_k$, $\phi_k$) of the focused point light source 107k.

In S1402, the measurement application 210 derives standard deviations of the incident angles and the azimuthal angles of incidence ($\theta_k$, $\phi_k$) thus derived, and outputs reciprocal numbers of the derived standard deviations as the evaluation values. Here, the reciprocal numbers of the derived standard deviations are outputted as the evaluation values in order to optimize the positions of the turned-on light sources so as to increase the standard deviations of the incident angles and the azimuthal angles of incidence thus derived. In this way, the positions of the turned-on light sources are derived in such a way as to disperse the incident angles and the azimuthal angles of incidence. This makes it possible to perform the illuminance unevenness correction at high accuracy with a small number of the turned-on light sources.

Figure 15:
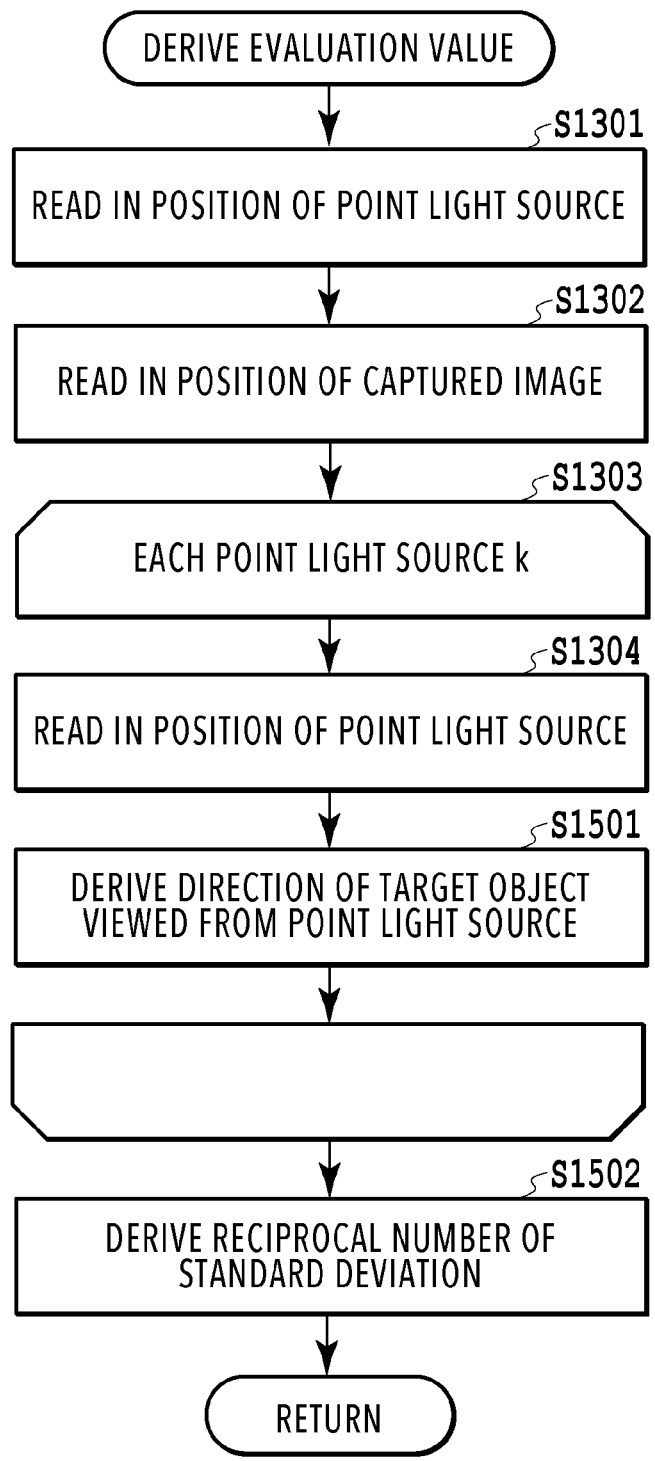
FIG. 15 is a flowchart showing processing to derive an evaluation value based on a direction of the target object viewed from the light source according to one embodiment.

FIG. 15 is a flowchart for explaining the method of deriving an evaluation value based on the direction of the target object viewed from the point light source. Here, S1501 and S1502 are different from the flowchart in FIG. 14.

In S1501, the measurement application 210 derives a direction ($\theta'_k$, $\phi'_k$) of the representative point on the target object viewed from the focused point light source 107k. The position (x (u, v), y (u, v), z (u, v)) in real space corresponding to the pixel position (u, v) in the captured image and the position ($x_{Li}$, $y_{Li}$, $z_{Li}$) in real space corresponding to the focused point light source are used to derive the direction ($\theta'_k$, $\phi'_k$). The position (x (u, v), y (u, v), z (u, v)) and the position ($x_{Li}$, $y_{Li}$, $z_{Li}$) are the values read in S1302 and S1303. In this embodiment, the position of the representative point on the target object is defined as the center point of the captured image. In other words, the direction of the target object viewed from the focused point light source 107$k$ is derived on the premise that (x (u, v), y (u, v), z (u, v))=(0, 0, 0) holds true. Here, the directions of the target object viewed from the focused point light sources 107$k$ may be derived in terms of all the pixels in the captured image and average values thereof may be defined as the direction ($\theta'_k$, $\phi'_k$) of the target object viewed from the focused point light source 107$k$.

In S1502, a standard deviation of the derived directions ($\theta'_k$, $\phi'_k$) of the target object viewed from the focused point light sources 107$k$ is derived, and a reciprocal number of the derived standard deviation is outputted as the evaluation value. Here, the reciprocal number of the derived standard deviation is outputted as the evaluation value in order to optimize the positions of the turned-on light sources so as to increase the standard deviation of the derived directions of the target object viewed from the point light sources. In this way, the positions of the turned-on light sources are derived in such a way as to disperse the directions of the target object viewed from the point light sources. This makes it possible to perform the illuminance unevenness correction at high accuracy with a small number of the turned-on light sources.

The point light sources to be used for capturing the images of the reference object can be appropriately selected by carrying out the processing control described above. Accordingly, it is possible to obtain the reflectance properties in the vicinity of the specular reflection angle of the target object at high accuracy with a reduced number of times of capturing the images of the reference object.

Third Embodiment

The description has been made so far on the assumption that there are no individual differences in luminance among the point light sources 107. In reality, however, the point light sources 107 may cause the illuminance unevenness due to the individual differences in luminance. Here, a bright point light source 107 tends to be bright every time while a dark point light source 107 tends to be dark every time. Given the situation, a method of obtaining information on individual differences in luminance of the point light sources 107 in advance and generating the illuminance unevenness correction data based on the information on the individual differences in luminance of the point light sources 107 will be described in a third embodiment. Note that a structural configuration of a reflectance property obtaining system and a functional configuration of a control apparatus in the third embodiment are the same as those in the first embodiment, and explanations thereof will be omitted. Instead, a brief description will be given below mainly of different features from the first embodiment.

Figure 16:
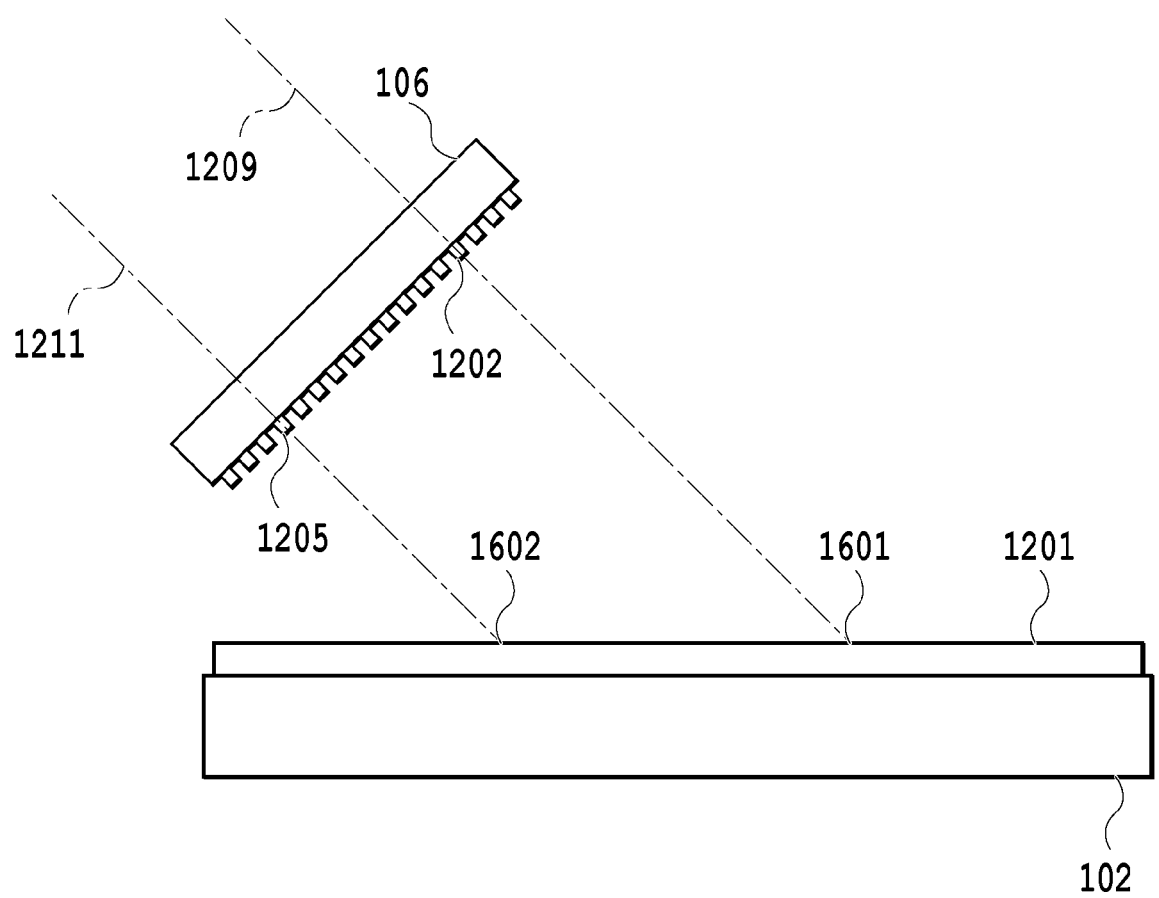
FIG. 16 is a schematic diagram for explaining a method of obtaining information on individual differences in luminance of the light source according to one embodiment.

FIG. 16 is a schematic diagram for explaining a method of obtaining the information on the individual differences in luminance of the point light sources.

Reference numeral 1601 denotes a point of intersection of the aforementioned line 1209 with a representative position of the target object 1201, and reference numeral 1602 denotes a point of intersection of the aforementioned line 1211 with a representative position of the target object 1201. An incident angle at the point of intersection 1601 in the case of capturing an image by using the point light source 1202 is equal to an incident angle at the point of intersection 1602 in the case of capturing an image by using the point light source 1205. Meanwhile, the direction of the point of intersection 1601 viewed from the point light source 1202 is also equal to the direction of the point of intersection 1602 viewed from the point light source 1205. However, a distance from the point light source 1202 to the point of intersection 1601 is different from a distance from the point light source 1205 to the point of intersection 1602. It is therefore necessary to correct a difference in illuminance attributed to the difference in distance in order to obtain the difference in luminance between the point light source 1202 and the point light source 1205. To be more precise, values of the illuminance at the points of intersection 1601 and 1602 are obtained by capturing images while using the point light sources 1202 and 1205, respectively. Moreover, the distance from the point light source 1202 to the point of intersection 1601 and the distance from the point light source 1205 to the point of intersection 1602 are obtained. Then, correction processing may be carried out by using the concept that the light emitted from the point light source attenuates with the distance.

Note that the method of obtaining the information on the individual differences in luminance of the point light sources 107 is not limited only to this method. For example, the image capturing may be carried out after moving the illumination device 106 to a position located face to face to a representative position of the white plate provided to the fixture 102, thereby obtaining the information on the individual differences in luminance of the point light sources 107. In this case, the distance from the respective point light sources 107 to the representative positions of the white plate becomes constant. Accordingly, it is not necessary to carry out the correction processing by using the concept that intensities of the light emitted from the point light sources 107 attenuate so as to reflect the differences in distance among them.

In the third embodiment, the measurement application 210 reads in the three captured images of the white plate which are read in S707 and the information on the individual differences in luminance of the point light sources 107 in S708 of FIG. 7, thereby generating an image corresponding to the focused point light source 107$i$. To be more precise, the measurement application 210 derives the distance from the focused point light source 107$i$ to the turned-on light source 602 to begin with. Moreover, the measurement application 210 derives the pixel value for each pixel in the image by carrying out the interpolation processing by using the pixel values corresponding to the three captured images of the white plate read in S707 and the weight corresponding to the derived distance. Then, the measurement application 210 generates the image corresponding to the focused point light source 107$i$ by subjecting the pixel values of the respective pixels, which are obtained by carrying out the interpolation processing, to the correction processing such as addition in accordance with the information on the individual differences in luminance of the focused point light source 107$i$.

The illuminance unevenness correction data can be generated while taking into account the individual differences by carrying out the above-described processing control even in the case where there are the individual differences in luminance among the point light sources 107. Accordingly, it is possible to obtain the reflectance properties in the vicinity of the specular reflection angle of the target object at high accuracy while reducing the number of times of capturing images of the reference object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Regarding the reflectance property deriving unit 208 and the turned-on light source derivation processing in S1002 and the like out of the respective processing units and the sets of the processing described above, the processing may be carried out by using a learned model subjected to machine learning instead. In this case, combinations of input data to the processing unit and output data from the processing unit are prepared as sets of learning data. Then, knowledge is obtained from the learning data by machine learning, and a learned model is generated which is designed to output the output data in response to the input data based on the obtained knowledge. The learned model can be formed from a neural network model, for example. Moreover, the learned model carries out the processing of the processing unit by being operated as a program for carrying out the processing equivalent to the processing unit in conjunction with any of a CPU, a GPU, and the like. Here, the learned model may be updated after carrying out a predetermined quantity of the processing as appropriate.

According to various embodiments of the present disclosure, it is possible to reduce the number of times of capturing imaged for illuminance correction as compared to the related art.

This application claims the benefit of Japanese Patent Application No. 2020-088909 filed May 21, 2020, which is hereby incorporated by reference wherein in its entirety.

What is claimed is:

1. A control apparatus comprising:
one or more processors; and
one or more memories storing instructions that when executed by the one or more processors, causes the control apparatus to perform operations comprising:
controlling an illumination device including a plurality of light sources, and an image capturing device including an optical system in which an optical axis of a lens on a light incident side is parallel to a principal ray, wherein such control is performed to obtain a first number of reference images corresponding to the first number of the light sources, each reference image being obtained by capturing an image of a reference object in a state of turning on the first number of the light sources one by one, the first number being less than a quantity of the plurality of light sources; and
generating correction data for correcting illuminance unevenness of a target image based on the first number of the reference images, the target image being obtained by capturing an image of a measurement target object being different from the reference object in a state of turning on a light source of interest out of the plurality of light sources,
wherein
the generated correction data corresponds to a light source included in the plurality of light sources but not included in the first number of the light sources is generated by carrying out interpolation processing while using at least two reference images out of the first number of the reference images.

2. The control apparatus according to claim 1, wherein a quantity of the light sources used for capturing the images of the reference object is less than a quantity of the light sources used for capturing the image of the measurement target object.

3. The control apparatus according to claim 1, wherein each light source in the illumination device is a diffused light source.

4. The control apparatus according to claim 1, wherein the optical system is a telecentric optical system.

5. The control apparatus according to claim 1, wherein the operations further comprise setting a position of a light source out of the plurality of light sources to be turned on in a case of capturing each reference image.

6. The control apparatus according to claim 5, wherein
the correction data corresponding to the set light source is defined as the reference image corresponding to the light source, and
the correction data corresponding to other light sources that are not set is defined as images corresponding to the other light sources derived by selecting a plurality of the reference images corresponding to the other light sources located near the light source and carrying out the interpolation processing based on the selected reference images.

7. The control apparatus according to claim 6, wherein
the operations further comprise deriving positions of the first number of the light sources used for capturing the images of the reference object, and
the deriving includes setting the first number, deriving initial positions of the first number of the light sources based on a random number, carrying out optimization of an evaluation value based on a cause of occurrence of illuminance unevenness on a surface of the reference object by the plurality of light sources, and determining positions of the light sources corresponding to the optimized evaluation value as the positions of the first number of the light sources.

8. The control apparatus according to claim 7, wherein the evaluation value is a value representing bias of illuminance on the surface of the reference object concerning the first number of the light sources selected from the plurality of light sources.

9. The control apparatus according to claim 7, wherein
the evaluation value is a reciprocal number of a standard deviation of distances from the light sources used for capturing the images of the reference object to a representative position of the measurement target object, and
the deriving carries out the optimization so as to derive a minimum value of the evaluation value.

10. The control apparatus according to claim 7, wherein
the evaluation value is a reciprocal number of a standard deviation of incident angles at a representative position of the measurement target object from the light sources used for capturing the images of the reference object, and
the deriving carries out the optimization so as to derive a minimum value of the evaluation value.

11. The control apparatus according to claim 7, wherein
the evaluation value is a reciprocal number of a standard deviation of directions of a representative position of the measurement target object viewed from the light sources used for capturing the images of the reference object, and
the deriving carries out the optimization so as to derive a minimum value of the evaluation value.

12. The control apparatus according to claim 1, wherein the generating correction data corrects the correction data in accordance with information on individual differences in luminance of the light sources corresponding to the correction data.

13. The control apparatus according to claim 1, wherein the operations further comprise:
obtaining a second number of measurement target images corresponding to the second number of the light sources out of the plurality of light sources, each measurement target image being obtained by capturing an image of the measurement target object in a state of turning on the second number of the light sources one by one, and
deriving reflectance property information on the measurement target object based on the measurement target images and the reference images.

14. The control apparatus according to claim 13, wherein the deriving reflectance property information includes deriving a reflectance ratio corresponding to each pixel in each measurement target image as the reflectance property information by dividing a pixel value of each pixel in the measurement target image by a pixel value of each pixel in the correction data.

15. The control apparatus according to claim 1, wherein the interpolation processing is carried out by using the reference images corresponding to two or more light sources out of the plurality of light sources located near the light source of interest.

16. A control method comprising:
controlling an illumination device including a plurality of light sources, and an image capturing device including an optical system in which an optical axis of a lens on a light incident side is parallel to a principal ray, and obtaining a first number of reference images corresponding to the first number of the light sources, each reference image being obtained by capturing an image of a reference object in a state of turning on the first number of the light sources one by one, the first number being less than a quantity of the plurality of light sources; and
generating correction data for correcting illuminance unevenness of a target image based on the first number of the reference images, the target image being obtained by capturing an image of a measurement target object being different from the reference object in a state of turning on a light source of interest out of the plurality of light sources, wherein
the correction data corresponding to a light source included in the plurality of light sources but not included in the first number of the light sources is generated in the generating by carrying out interpolation processing while using at least two reference images out of the first number of the reference images.

17. A non-transitory computer readable storage medium storing a program to cause a computer to execute a control process comprising:
controlling an illumination device including a plurality of light sources, and an image capturing device including an optical system in which an optical axis of a lens on a light incident side is parallel to a principal ray, and obtaining a first number of reference images corresponding to the first number of the light sources, each reference image being obtained by capturing an image of a reference object in a state of turning on the first number of the light sources one by one, the first number being less than a quantity of the plurality of light sources; and
generating correction data for correcting illuminance unevenness of a target image based on the first number of the reference images, the target image being obtained by capturing an image of a measurement target object being different from the reference object in a state of turning on a light source of interest out of the plurality of light sources, wherein
the correction data corresponding to a light source included in the plurality of light sources but not included in the first number of the light sources is generated in the generating by carrying out interpolation processing while using at least two reference images out of the first number of the reference images.

* * * * *